United States Patent
Faccin et al.

(10) Patent No.: US 10,674,346 B2
(45) Date of Patent: Jun. 2, 2020

(54) CONNECTIVITY TO A CORE NETWORK VIA AN ACCESS NETWORK

(71) Applicant: QUALCOMM Incorporated, San Diego, CA (US)

(72) Inventors: Stefano Faccin, San Ysidro, CA (US); Haris Zisimopoulos, London (GB)

(73) Assignee: QUALCOMM Incorporated, San Diego, CA (US)

( * ) Notice: Subject to any disclaimer, the term of this patent is extended or adjusted under 35 U.S.C. 154(b) by 11 days.

(21) Appl. No.: 15/727,406

(22) Filed: Oct. 6, 2017

(65) Prior Publication Data

US 2018/0103363 A1    Apr. 12, 2018

Related U.S. Application Data

(60) Provisional application No. 62/406,392, filed on Oct. 10, 2016.

(51) Int. Cl.
*H04W 8/00* (2009.01)
*H04W 84/12* (2009.01)
(Continued)

(52) U.S. Cl.
CPC ............ *H04W 8/005* (2013.01); *H04L 12/66* (2013.01); *H04L 63/08* (2013.01); *H04L 67/14* (2013.01);
(Continued)

(58) Field of Classification Search
CPC ......... H04L 12/66; H04L 63/08; H04L 67/14; H04L 67/16; H04W 12/06; H04W 8/005;
(Continued)

(56) References Cited

U.S. PATENT DOCUMENTS

| 2010/0199332 A1* | 8/2010 | Bachmann | H04L 63/0428 |
| | | | 726/4 |
| 2014/0078967 A1* | 3/2014 | Turanyi | H04W 8/082 |
| | | | 370/328 |

(Continued)

OTHER PUBLICATIONS

3GPP, "3rd Generation Partnership Project; Technical Specification Group GSM/EDGE Radio Access Network; Generic Access Network (GAN); Stage 2 (Release 11)" 3GPP Technical Specification, Sep. 2012, 128 pgs, 3GPP TS 43.318, V11.0.0, XP051292548, 3rd Generation Partnership Project, Sophia-Antipolis Valbonne, France.

(Continued)

*Primary Examiner* — Steven H Nguyen
(74) *Attorney, Agent, or Firm* — Holland & Hart LLP

(57) ABSTRACT

Methods, systems, and devices for wireless communications are described that supports connectivity to a core network via an access network. A user equipment (UE) may establish connectivity with an access network and perform a discovery procedure to identify and select a packet data gateway that provides connectivity to a core network via a core network node. The UE may perform an authentication procedure with the core network node via the packet data gateway to be authenticated with the core network for establishing connectivity with the packet data gateway. The UE may receive a set of control plane addressing information via the packet data gateway corresponding to a secure tunnel established between the UE and the packet data gateway. The UE may perform an attach procedure via the secure tunnel with the core network node without re-authenticating the UE.

28 Claims, 21 Drawing Sheets

(51) Int. Cl.
*H04W 48/00* (2009.01)
*H04W 88/16* (2009.01)
*H04W 88/06* (2009.01)
*H04L 12/66* (2006.01)
*H04L 29/06* (2006.01)
*H04L 29/08* (2006.01)
*H04W 8/26* (2009.01)
*H04W 12/06* (2009.01)

(52) U.S. Cl.
CPC ............... *H04L 67/16* (2013.01); *H04W 8/26* (2013.01); *H04W 12/06* (2013.01); *H04W 48/17* (2013.01); *H04W 84/12* (2013.01); *H04W 88/06* (2013.01); *H04W 88/16* (2013.01)

(58) Field of Classification Search
CPC ....... H04W 8/26; H04W 48/17; H04W 84/12; H04W 88/06; H04W 88/16
See application file for complete search history.

(56) References Cited

U.S. PATENT DOCUMENTS

| 2014/0153559 | A1* | 6/2014 | Roeland | ................ | H04L 61/304 |
| | | | | | 370/338 |
| 2015/0350983 | A1 | 12/2015 | Kwok et al. | | |
| 2016/0295386 | A1* | 10/2016 | Faccin | ................ | H04L 63/0485 |
| 2017/0332416 | A1* | 11/2017 | Kiss | ....................... | H04L 61/304 |
| 2018/0343637 | A1* | 11/2018 | Landais | .............. | H04W 64/003 |

OTHER PUBLICATIONS

ISA/EP, International Search Report and Written Opinion of the International Searching Authority, Int'l Application No. PCT/US2017/055733, dated Jan. 8, 2018, European Patent Office, Rijswijk, NL, 17 pgs.

"Wi-Fi Calling—Extending the Reach of VoLTE to Wi-Fi," Ericsson Review—The Communications Technology Journal Since 1924, Jan. 30, 2015, 8 pgs., XP055251865, Ericsson, Stockholm, Sweden.

* cited by examiner

CONNECTIVITY TO A CORE NETWORK VIA AN ACCESS NETWORK

CROSS REFERENCES

The present application for patent claims priority to U.S. Provisional Patent Application No. 62/406,392 by Faccin et al., entitled "Connectivity To A Core Network Via An Access Network," filed Oct. 10, 2016, assigned to the assignee hereof, and which is hereby expressly incorporated by reference herein in its entirety.

INTRODUCTION

The following relates generally to wireless communications, and more specifically to connectivity to a core network via an access network.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems. A wireless multiple-access communications system may include a number of base stations, each simultaneously supporting communication for multiple communication devices, which may be otherwise known as user equipment (UE).

Mobile network operators enable external internet protocol (IP) access networks to access their core networks via the internet. To do so, a user device connects to an access network that provides internet connectivity, and the access network forwards IP packets from the user device over the internet to a network device on the core network. The network device receives and feeds the IP packets into the core network as if the IP packets were instead received by a base station.

A Wi-Fi phone call is an example of using an access network to connect to a core network. In Wi-Fi calling, a user device connects to an access point of an access network (e.g., a wireless local area network), and the call is routed via the access network to the core network. Another example is a broadband phone call where a broadband access network exchanges IP packets between a user device and a core network. Conventional solutions do not, however, provide suitable mechanisms for a user device to connect to a core network via an access network.

SUMMARY

The described techniques relate to improved methods, systems, devices, or apparatuses that support connectivity to a core network via an access network. A user equipment (UE) may initiate a discovery procedure via an access network for discovering a next generation packet data gateway (ngPDG) or an Evolved Packet Data Gateways (ePDGs), each of which support ngPDG functionality. The access network may be a trusted or untrusted non-3GPP access network. The UE may construct a discovery query for the discovery procedure so that a discovery response received in reply to the query identifies a list of one or more PDGs that each support ngPDG functionality, and does not list any PDGs that do not support ngPDG functionality. Additionally or alternatively, the discovery response may identify a list of one or more PDGs that each may or may not support ngPDG functionality, along with an indication as to which of the listed PDGs support ngPDG functionality and which of the listed PDGs do not support ngPDG functionality. The UE may establish connectivity with a PDG that supports ngPDG functionality via the access network, and may attach to a cellular core network via the PDG and the access network. Beneficially, the discovery procedure may enable the UE to identify a PDG that supports ngPDG functionality and use the identified PDG for attaching to a cellular core network via an access network.

A method of wireless communications is described. The method may include generating a discovery query for discovering a PDG that provides connectivity to a core network via a core network node, the discovery query including an identifier specifying a first type of PDG of a plurality of different types of PDGs, the first type of PDG supporting a defined functionality, transmitting the discovery query via an access network, and receiving, via the access network, a query response identifying at least one PDG that supports the defined functionality.

An apparatus for wireless communications is described. The apparatus may include means for generating a discovery query for discovering a PDG that provides connectivity to a core network via a core network node, the discovery query including an identifier specifying a first type of PDG of a plurality of different types of PDGs, the first type of PDG supporting a defined functionality, means for transmitting the discovery query via an access network, and means for receiving, via the access network, a query response identifying at least one PDG that supports the defined functionality.

Another apparatus for wireless communications is described. The apparatus may include a processor, memory in electronic communication with the processor, and instructions stored in the memory. The instructions may be operable to cause the processor to generate a discovery query for discovering a PDG that provides connectivity to a core network via a core network node, the discovery query including an identifier specifying a first type of PDG of a plurality of different types of PDGs, the first type of PDG supporting a defined functionality, transmit the discovery query via an access network, and receive, via the access network, a query response identifying at least one PDG that supports the defined functionality.

A non-transitory computer-readable medium for wireless communications is described. The non-transitory computer-readable medium may include instructions operable to cause a processor to generate a discovery query for discovering a PDG that provides connectivity to a core network via a core network node, the discovery query including an identifier specifying a first type of PDG of a plurality of different types of PDGs, the first type of PDG supporting a defined functionality, transmit the discovery query via an access network, and receive, via the access network, a query response identifying at least one PDG that supports the defined functionality.

In some examples of the method, apparatus, and non-transitory computer-readable medium described above, the query response identifies at least one PDG that does not support the defined functionality.

Some examples of the method, apparatus, and non-transitory computer-readable medium described above may further include processes, features, means, or instructions for transmitting a session request message via the access network to a first PDG of the at least one PDG. Some examples of the method, apparatus, and non-transitory computer-readable medium described above may further include processes, features, means, or instructions for receiving a session response message via the access network that includes a network address allocated to the UE for a session with the core network.

Some examples of the method, apparatus, and non-transitory computer-readable medium described above may further include processes, features, means, or instructions for transmitting the discovery query comprises generating a fully qualified domain name (FQDN) that comprises a label specifying the first type of PDG of the plurality of different types of PDGs, wherein the discovery query comprises the FQDN.

Some examples of the method, apparatus, and non-transitory computer-readable medium described above may further include processes, features, means, or instructions for transmitting an attach message to a first PDG of the at least one PDG via the access network for establishing connectivity with the core network node via the first PDG. Some examples of the method, apparatus, and non-transitory computer-readable medium described above may further include processes, features, means, or instructions for receiving an attach accept from the core network node via the first PDG and the access network.

In some examples of the method, apparatus, and non-transitory computer-readable medium described above, the attach message indicates either a secure attachment or implicit attachment. In some examples of the method, apparatus, and non-transitory computer-readable medium described above, the attach message indicates implicit attachment and that the UE does not support Non-Access Stratum (NAS) signaling. In some examples of the method, apparatus, and non-transitory computer-readable medium described above, the discovery query comprises a domain name service (DNS) query, the identifier comprises a domain name identifier, and the query response comprises a DNS response.

Some examples of the method, apparatus, and non-transitory computer-readable medium described above may further include processes, features, means, or instructions for determining a list of addresses of one or more PDGs of the at least one PDG that each support the defined functionality based at least in part on the query response.

Some examples of the method, apparatus, and non-transitory computer-readable medium described above may further include processes, features, means, or instructions for performing an authentication procedure with the core network node via a first PDG of the at least one PDG for authenticating the UE with the core network. Some examples of the method, apparatus, and non-transitory computer-readable medium described above may further include processes, features, means, or instructions for receiving control plane addressing information via the first PDG based at least in part on the authentication procedure. Some examples of the method, apparatus, and non-transitory computer-readable medium described above may further include processes, features, means, or instructions for performing, by transmitting an attach message to the first PDG using the control plane addressing information, an attach procedure with the core network node without re-authentication of the UE.

Some examples of the method, apparatus, and non-transitory computer-readable medium described above may further include processes, features, means, or instructions for transmitting control plane signaling to the core network node via the access network using the control plane addressing information. Some examples of the method, apparatus, and non-transitory computer-readable medium described above may further include processes, features, means, or instructions for performing the attach procedure further comprises establishing an internet protocol security (IPSec) tunnel with the first PDG via the access network.

Some examples of the method, apparatus, and non-transitory computer-readable medium described above may further include processes, features, means, or instructions for receiving a token from the core network node based at least in part on the authentication procedure. Some examples of the method, apparatus, and non-transitory computer-readable medium described above may further include processes, features, means, or instructions for transmitting the token in the attach message as an identifier of the UE.

In some examples of the method, apparatus, and non-transitory computer-readable medium described above, the attach procedure may be performed without re-authentication of the UE based at least in part on a security context established for the UE during the authentication procedure.

Some examples of the method, apparatus, and non-transitory computer-readable medium described above may further include processes, features, means, or instructions for transmitting a session request message to the first PDG using the control plane addressing information, the session request message including a request to establish a session with the core network. Some examples of the method, apparatus, and non-transitory computer-readable medium described above may further include processes, features, means, or instructions for transmitting the session request message comprises transmitting the session request message over User Datagram Protocol/Internet protocol (UDP/IP) in an IPSec tunnel based at least in part on the control plane addressing information. Some examples of the method, apparatus, and non-transitory computer-readable medium described above may further include processes, features, means, or instructions for receiving a session response message comprising a network address of a user plane for the session.

A method of wireless communications is described. The method may include performing an authentication procedure to authenticate a UE, creating a security context for the authenticated UE, receiving an attach message from a packet data gateway that is transmitted by a candidate UE via an access network after performing the authentication procedure, performing an attach procedure based at least in part on receiving the attach message without re-authenticating the candidate UE by processing the security context to verify that the candidate UE corresponds to the authenticated UE, and transmitting an attach accept message to the candidate UE via the packet data gateway and via the access network based at least in part on the attach procedure.

An apparatus for wireless communications is described. The apparatus may include means for performing an authentication procedure to authenticate a UE, means for creating a security context for the authenticated UE, means for receiving an attach message from a packet data gateway that is transmitted by a candidate UE via an access network after performing the authentication procedure, means for performing an attach procedure based at least in part on receiving the attach message without re-authenticating the candidate UE by processing the security context to verify that the candidate UE corresponds to the authenticated UE, and means for transmitting an attach accept message to the candidate UE via the packet data gateway and via the access network based at least in part on the attach procedure.

Another apparatus for wireless communications is described. The apparatus may include a processor, memory in electronic communication with the processor, and instructions stored in the memory. The instructions may be operable to cause the processor to perform an authentication procedure to authenticate a UE, create a security context for the authenticated UE, receive an attach message from a packet data gateway that is transmitted by a candidate UE via an access network after performing the authentication procedure, perform an attach procedure based at least in part on receiving the attach message without re-authenticating the candidate UE by processing the security context to verify that the candidate UE corresponds to the authenticated UE, and transmit an attach accept message to the candidate UE via the packet data gateway and via the access network based at least in part on the attach procedure.

A non-transitory computer-readable medium for wireless communications is described. The non-transitory computer-readable medium may include instructions operable to cause a processor to perform an authentication procedure to authenticate a UE, create a security context for the authenticated UE, receive an attach message from a packet data gateway that is transmitted by a candidate UE via an access network after performing the authentication procedure, perform an attach procedure based at least in part on receiving the attach message without re-authenticating the candidate UE by processing the security context to verify that the candidate UE corresponds to the authenticated UE, and transmit an attach accept message to the candidate UE via the packet data gateway and via the access network based at least in part on the attach procedure.

Some examples of the method, apparatus, and non-transitory computer-readable medium described above may further include processes, features, means, or instructions for determining a type of the access network based at least in part on the attach message. Some examples of the method, apparatus, and non-transitory computer-readable medium described above may further include processes, features, means, or instructions for determining a type of the access network based at least in part on information received from the packet data gateway.

Some examples of the method, apparatus, and non-transitory computer-readable medium described above may further include processes, features, means, or instructions for generating a secure token based at least in part on the authentication procedure successfully authenticating the UE. Some examples of the method, apparatus, and non-transitory computer-readable medium described above may further include processes, features, means, or instructions for transmitting the secure token to the authenticated UE via the packet data gateway and via the access network.

In some examples of the method, apparatus, and non-transitory computer-readable medium described above, verifying that the candidate UE corresponds to the authenticated UE comprises: retrieving a candidate secure token included in the attach message. Some examples of the method, apparatus, and non-transitory computer-readable medium described above may further include processes, features, means, or instructions for verifying that the candidate secure token corresponds to the secure token associated with the authenticated UE.

In some examples of the method, apparatus, and non-transitory computer-readable medium described above, verifying that the candidate UE corresponds to the authenticated UE comprises: requesting that at least an authentication function (AUF) node, or the packet data gateway, or a combination thereof, determine whether a candidate secure token included in the attach message corresponds to the secure token.

Some examples of the method, apparatus, and non-transitory computer-readable medium described above may further include processes, features, means, or instructions for transmitting the security context to at least an AUF node, or the packet data gateway, or a combination thereof.

In some examples of the method, apparatus, and non-transitory computer-readable medium described above, verifying that the candidate UE corresponds to the authenticated UE comprises: requesting that at least the AUF node, or the packet data gateway, or a combination thereof, process an identity of the candidate UE included in the attach message to determine whether the candidate UE corresponds to the authenticated UE.

Some examples of the method, apparatus, and non-transitory computer-readable medium described above may further include processes, features, means, or instructions for receiving a session request from the UE requesting connectivity to the core network, the session request received from the UE via the access network and via the packet data gateway. Some examples of the method, apparatus, and non-transitory computer-readable medium described above may further include processes, features, means, or instructions for performing user plane setup with the core network based at least in part on the session request. Some examples of the method, apparatus, and non-transitory computer-readable medium described above may further include processes, features, means, or instructions for assigning a network address for a session based at least in part on the user plane setup. Some examples of the method, apparatus, and non-transitory computer-readable medium described above may further include processes, features, means, or instructions for providing the assigned network address for the session to the UE via the access network and via the packet data gateway.

A method of wireless communications by a UE is described. The method may include establishing connectivity with an access network, performing, via the access network, a discovery procedure to identify and select a packet data gateway that provides connectivity to a core network via a core network node, performing an authentication procedure with the core network node via the packet data gateway to be authenticated with the core network for establishing connectivity with the packet data gateway, receiving a set of control plane addressing information via the packet data gateway based at least in part on the authentication procedure, and performing, by transmitting via the connectivity with the packet data gateway an attach message to the packet data gateway, an attach procedure with the core network node, the transmitting the attach message using the control plane addressing information and the attach procedure being performed without re-authenticating the UE.

An apparatus for wireless communications by a UE is described. The apparatus may include means for establishing connectivity with an access network, means for performing, via the access network, a discovery procedure to identify and select a packet data gateway that provides connectivity to a core network via a core network node, means for performing an authentication procedure with the core network node via the packet data gateway to be authenticated with the core network for establishing connectivity with the packet data gateway, means for receiving a set of control plane addressing information via the packet data gateway based at least in part on the authentication procedure, and means for performing, by transmitting via the connectivity with the packet data gateway an attach message to the packet data gateway, an attach procedure with the core network node, the transmitting the attach message using the control plane addressing information and the attach procedure being performed without re-authenticating the UE.

Another apparatus for wireless communications by a UE is described. The apparatus may include a processor, memory in electronic communication with the processor, and instructions stored in the memory. The instructions may be operable to cause the processor to establish connectivity with an access network, perform, via the access network, a discovery procedure to identify and select a packet data gateway that provides connectivity to a core network via a core network node, perform an authentication procedure with the core network node via the packet data gateway to be authenticated with the core network for establishing connectivity with the packet data gateway, receive a set of control plane addressing information via the packet data gateway based at least in part on the authentication procedure, and perform, by transmitting via the connectivity with the packet data gateway an attach message to the packet data gateway, an attach procedure with the core network node, the transmitting the attach message using the control plane addressing information and the attach procedure being performed without re-authenticating the UE.

A non-transitory computer readable medium for wireless communications by a UE is described. The non-transitory computer-readable medium may include instructions operable to cause a processor to establish connectivity with an access network, perform, via the access network, a discovery procedure to identify and select a packet data gateway that provides connectivity to a core network via a core network node, perform an authentication procedure with the core network node via the packet data gateway to be authenticated with the core network for establishing connectivity with the packet data gateway, receive a set of control plane addressing information via the packet data gateway based at least in part on the authentication procedure, and perform, by transmitting via the connectivity with the packet data gateway an attach message to the packet data gateway, an attach procedure with the core network node, the transmitting the attach message using the control plane addressing information and the attach procedure being performed without re-authenticating the UE.

In some examples of the method, apparatus, and non-transitory computer-readable medium described above, performing the authentication procedure with the core network node via the packet data gateway to be authenticated with the core network for establishing connectivity with the packet data gateway comprises: establishing an IPSec tunnel with the packet data gateway via the access network.

In some examples of the method, apparatus, and non-transitory computer-readable medium described above, the attach procedure being performed without re-authenticating the UE may be based at least in part on a security context established for the UE during the authentication procedure.

In some examples of the method, apparatus, and non-transitory computer-readable medium described above, performing the discovery procedure comprises: generating a DNS query that includes a domain name identifier that specifies a type of core network having a defined functionality. In some examples of the method, apparatus, and non-transitory computer-readable medium described above, generating the DNS query comprises: constructing a FQDN that specifies the type of core network. Some examples of the method, apparatus, and non-transitory computer-readable medium described above may further include processes, features, means, or instructions for processing a DNS response that indicates the packet data gateway provides the defined functionality.

Some examples of the method, apparatus, and non-transitory computer-readable medium described above may further include processes, features, means, or instructions for transmitting a session request message to the packet data gateway using the set of control plane addressing information, the session request message including a request to establish a session with the core network. Some examples of the method, apparatus, and non-transitory computer-readable medium described above may further include processes, features, means, or instructions for receiving a session response message that includes a network address allocated to the UE for the session.

Some examples of the method, apparatus, and non-transitory computer-readable medium described above may further include processes, features, means, or instructions for establishing a security association with the packet data gateway based at least in part on security association trigger received from the packet data gateway. Some examples of the method, apparatus, and non-transitory computer-readable medium described above may further include processes, features, means, or instructions for associating the security association with the session and the network address allocated to the UE for the session.

In some examples of the method, apparatus, and non-transitory computer-readable medium described above, transmitting the session request message comprises: transmitting the session request message over UDP/IP in an IPSec tunnel based at least in part on the set of control plane addressing information.

In some examples of the method, apparatus, and non-transitory computer-readable medium described above, transmitting the attach message comprises: transmitting an identifier of the UE in the attach message that may be the same as the identifier of the UE used in performing the authentication procedure.

In some examples of the method, apparatus, and non-transitory computer-readable medium described above, receiving a token from the core network node based at least in part on the authentication procedure, wherein transmitting the attach message comprises: transmitting the token in the attach message as an identifier of the UE.

DETAILED DESCRIPTION

Figure 1:
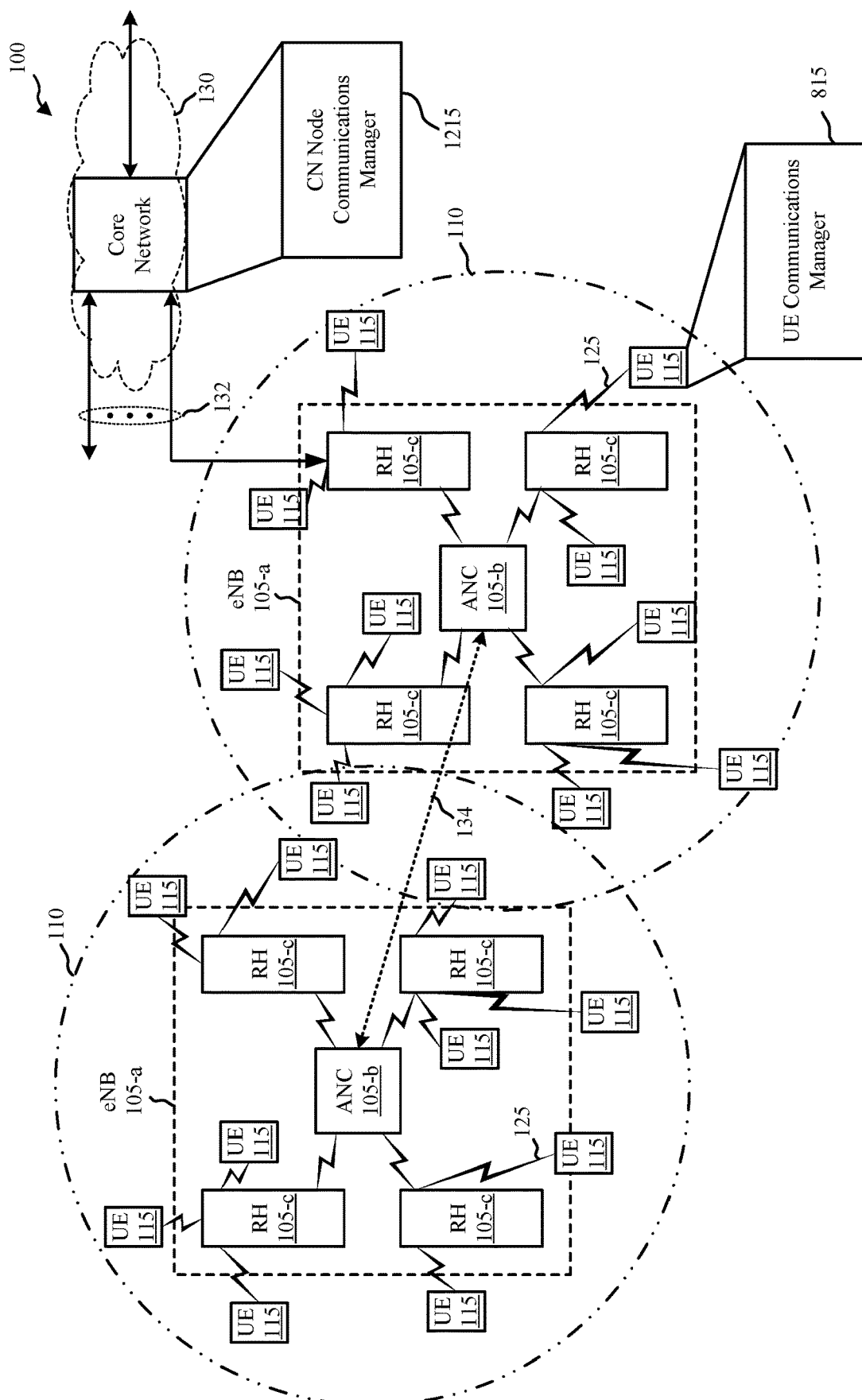
FIG. 1 illustrates an example of a system for wireless communications that supports connectivity to a core network via an access network in accordance with one or more aspects of the present disclosure.

Techniques for providing connectivity to a core network via an access network are described. A user equipment (UE) may initiate a discovery procedure via an access network for discovering a next generation packet data gateway (ngPDG) or an Evolved Packet Data Gateways (ePDGs), each of which support ngPDG functionality. The UE may construct a discovery query for the discovery procedure so that a discovery response received in reply to the query includes a list of one or more network addresses of PDGs that each support ngPDG functionality, and does not list any PDGs that do not support ngPDG functionality. Additionally or alternatively, the discovery response may include a list of network addresses of one or more PDGs along with an indication as to which of the listed PDGs support ngPDG functionality and which of the listed PDGs do not support ngPDG functionality. In some examples, the UE may construct a discovery query specifying a type of PDG of multiple different types of PDGs. The type of PDG may indicate that the UE is seeking a PDG that supports ngPDG functionality, instead of other PDGs that do not support ngPDG functionality. In some examples, the discovery query may include a domain name identifier, such as a fully qualified domain name (FQDN). The FQDN may indicate that the UE is requesting a network address of a ngPDG or ePDG that also supports ngPDG functionality.

The UE may receive a response to the discovery query from a next generation core network (NGC). The response may contain a list of one or more network addresses of available ngPDGs, ePDGs having ngPDG functionality, or both. The UE may select and establish connectivity with a PDG that supports ngPDG functionality via the access network. The UE subsequently may perform an attach procedure to the NGC via the PDG and the access network. Beneficially, the discovery procedure may enable the UE to identify a PDG that supports ngPDG functionality and use the identified PDG for attaching to a NGC via an access network. The discovery procedure described herein may also reduce latency when connecting to a NGC because the constructed discovery query solicits network addresses of PDGs that support ngPDG functionality. The UE may avoid delays that would otherwise result from the UE connecting to a PDG that does not support ngPDG functionality, and having to connect to one or more additional PDGs seeking to identify a PDG that supports ngPDG functionality. The techniques described herein are applicable to both trusted and untrusted non-3GPP access networks.

The examples provided herein also describe a UE creating a secure tunnel via an access network (e.g., non-3GPP access network) for connecting to a core network (e.g., a 3GPP core network). The 3rd Generation Partnership Project (3GPP) is a telecommunications standard development organization that provides reports and specifications that define 3GPP technologies. 3GPP has defined conventional solutions for a non-3GPP access network to connect to a 3GPP core network in an Evolved Packet Core (EPC). EPC defines two types of non-3GPP accesses: trusted non-3GPP accesses and untrusted non-3GPP accesses. In the EPC definition, Trusted and Untrusted Non-3GPP Access Networks are IP access networks that use access technology whose specification is outside the scope of 3GPP (e.g., wireless local area network (WLAN), fixed broadband, etc.). The 3GPP is defining a NGC that provides service over both a next generation radio access network (NG RAN) (e.g., a 5G RAN or an Evolved Universal Terrestrial Radio Access Network (E-UTRAN) radio access network (RAN) evolved to connect to the NGC) and over non-3GPP accesses directly integrated in a NG system with the same set of interfaces defined for NG RAN.

A UE and core network node, as described herein, may interact to provide the UE with a mechanism that supports connectivity to a core network via an access network. In an example, the UE may establish IP connectivity with an access network via an access point for internet access. The access point may operate, for example, in accordance with one or more of the Institute of Electrical and Electronics Engineers (IEEE) 802.11 standards including, but not limited to, 802.11b, 802.11g, 802.11a, 802.11n, 802.11ac, 802.11ad, 802.11ah, 802.11ax, etc.

When desiring access to the core network, a UE may perform, via the access network, a discovery procedure to identify and select a packet data gateway that provides connectivity (e.g., IP connectivity) to the core network via a core network node. The UE may then perform an authentication procedure with the core network node via the packet data gateway to establish secure tunnel connectivity with the packet data gateway. If able to successfully authenticate the UE, the core network node may establish a secure tunnel and create a security context for the authenticated UE. The core network node may use the security context in a subsequent attach procedure to avoid having to re-authenticate the UE.

As part of a successful authentication, the packet data gateway may provide the UE with a set of control plane addressing information corresponding to the established secure tunnel. The UE may subsequently perform a control plane procedure (e.g., an attach procedure). Control plane procedures may be used for performing control operations, including, but not limited to, network attaches, security control, authentication, setting up of bearers, mobility management, or the like. In an example of a control plane procedure, the UE may perform an attach procedure with the core network node by transmitting an attach message to the packet data gateway via the secure tunnel using the control plane addressing information. Advantageously, control plane procedures, such as an attach procedure, may be performed without the core network node having to re-authenticate the UE. Once successfully attached to the core network, the UE may request a session for connecting to a data network (DN) via the core network.

Aspects of the disclosure are initially described in the context of a wireless communications system. The wireless communications system may provide a single authentication procedure whereby a UE authenticated when establishing a secure tunnel is not re-authenticated in a subsequent attachment procedure when the UE requests to attach to a core network via the secure tunnel. Aspects of the disclosure are further illustrated by and described with reference to apparatus diagrams, system diagrams, and flowcharts that relate to connectivity to a core network via an access network.

FIG. 1 illustrates an example of a wireless communications system 100 that supports connectivity to a core network via an access network in accordance with one or more aspects of the present disclosure. The wireless communications system 100 may include network devices 105, UEs 115, and a core network 130. The core network 130 may provide user authentication, access authorization, tracking, Internet Protocol (IP) connectivity, and other access, routing, or mobility functions. At least some of the network devices 105 (e.g., network device 105-a, which may be an example of an eNB or a base station, or network device 105-b, which may be an example of an access node controller (ANC)) may interface with the core network 130 through backhaul links 132 (e.g., S1, S2, etc.) and may perform radio configuration and scheduling for communication with the UEs 115. Network devices 105 may also be gNodeBs (gNBs), radio heads (RHs), or the like. At least some of the network devices 105 may be an WLAN access point (e.g., Wi-Fi access point) that may communicate with UEs 115 according to the WLAN radio and baseband protocol for physical and Medium Access Control (MAC) layers from IEEE 802.11 and versions including, but not limited to, 802.11b, 802.11g, 802.11a, 802.11n, 802.11ac, 802.11ad, 802.11ah, 802.11ax, etc. In various examples, the network devices 105-b may communicate, either directly or indirectly (e.g., through core network 130), with each other over backhaul links 134 (e.g., X1, X2, etc.), which may be wired or wireless communications links.

Each network device 105-b may also communicate with a number of UEs 115 through a number of other network devices 105-c, where network device 105-c may be an example of a smart radio head. In alternative configurations, various functions of each network device 105 may be distributed across various network devices 105 (e.g., radio heads and access network controllers) or consolidated into a single network device 105 (e.g., a base station).

A macro cell may cover a relatively large geographic area (e.g., several kilometers in radius) and may allow unrestricted access by UEs 115 with service subscriptions with a network provider. A small cell may include a lower-powered radio head or base station, as compared with a macro cell, and may operate in the same or different frequency band(s) as macro cells. Small cells may include pico cells, femto cells, and micro cells according to various examples. A pico cell may cover a relatively smaller geographic area and may allow unrestricted access by UEs 115 with service subscriptions with a network provider. A femto cell also may cover a relatively small geographic area (e.g., a home) and may provide restricted access by UEs 115 having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers). A gNB for a macro cell may be referred to as a macro gNB. A gNB for a small cell may be referred to as a small cell gNB, a pico gNB, a femto gNB, or a home gNB. A gNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system 100 may support synchronous or asynchronous operation. For synchronous operation, the network devices 105-a and/or network devices 105-c may have similar frame timing, and transmissions from different network devices 105-a and/or network devices 105-c may be approximately aligned in time. For asynchronous operation, the network devices 105-a and/or network devices 105-c may have different frame timings, and transmissions from different network devices 105-a and/or network devices 105-c may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A MAC layer may perform priority handling and multiplexing of logical channels into transport channels. The MAC layer may also use Hybrid ARQ (HARQ) to provide retransmission at the MAC layer to improve link efficiency. In the control plane, the Radio Resource Control (RRC) protocol layer may provide establishment, configuration, and maintenance of an RRC connection between a UE 115 and a network device 105-c, network device 105-b, or core network 130 supporting radio bearers for user plane data. At the Physical (PHY) layer, transport channels may be mapped to physical channels.

The UEs 115 may be dispersed throughout the wireless communications system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communications device, a handheld device, a tablet computer, a laptop computer, a cordless phone, a wireless local loop (WLL) station, a IoE device, or the like. A UE may be able to communicate with various types of network devices 105-a, network devices 105-c, base stations, access points, or other network devices, including macro eNBs, small cell eNBs, relay base stations, and the like. A UE may also be able to communicate directly with other UEs (e.g., using a peer-to-peer (P2P) protocol).

The communication links 125 shown in wireless communications system 100 may include uplink (UL) channels from a UE 115 to a network device 105-c, and/or downlink (DL) channels, from a network device 105-c to a UE 115. The downlink channels may also be called forward link channels, while the uplink channels may also be called reverse link channels. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

A UE 115 may include a UE communications manager 815 for obtaining connectivity to core network 130 via an access network. Core network 130 may include a core network node having a core network node communications manager 1215. The core network node communications manager 1215 may perform a single authentication of a UE 115 such that the UE 115 is not re-authenticated in a subsequent attach procedure when providing the UE 115 connectivity to the core network 130.

In some cases, a UE 115 may monitor a communication link 125 continuously for an indication that the UE 115 may receive data. In other cases (e.g., to conserve power and extend battery life) a UE 115 may be configured with a discontinuous reception (DRX) or discontinuous transmission (DTX) cycle. A DRX cycle consists of an "on duration" when the UE 115 may monitor for control information (e.g., on PDCCH) and a "DRX period" when the UE 115 may power down radio components. A DTX cycle consists of an "on duration" when the UE 115 may transmit a scheduling request and a "DTX period" when the UE 115 may power down radio components. In some cases, a UE 115 may be configured with a short DRX or DTX cycle and a long DRX or DTX cycle. In some cases, a UE 115 may enter a long DRX or DTX cycle if it is inactive for one or more short DRX or DTX cycles. The transition between the short DRX or DTX cycle, the long DRX or DTX cycle and continuous reception may be controlled by an internal timer or by messaging from a network device 105. In some examples, wireless communications system 100 may support dynamic RO and TO configurations to enable reduced latency and reduced power consumption. For example, wireless communications system 100 may support a TO following the reception of data during the on duration of a DRX configuration. Additionally or alternatively, a subsequent RO may follow the transmission of data during the on duration of a DTX configuration.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both frequency division duplex (FDD) and time division duplex (TDD) component carriers.

In some cases, wireless communications system 100 may utilize enhanced component carriers (eCCs). An eCC may be characterized by one or more features including: wider bandwidth, shorter symbol duration, shorter transmission time interval (TTIs), and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 Mhz, etc.) at reduced symbol durations (e.g., 16.67 microseconds). A TTI in eCC may consist of one or multiple symbols. In some cases, the TTI duration (that is, the number of symbols in a TTI) may be variable. In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 Mhz, etc.) at reduced symbol durations (e.g., 16.67 microseconds). A TTI in eCC may consist of one or multiple symbols. In some cases, the TTI duration (that is, the number of symbols in a TTI) may be variable.

The wireless communications system 100 may authenticate a UE 115 when establishing a secure tunnel via an access network but skip authenticating the UE 115 in a subsequent attachment procedure for attaching to core network 130 via the secure tunnel.

Figure 2:
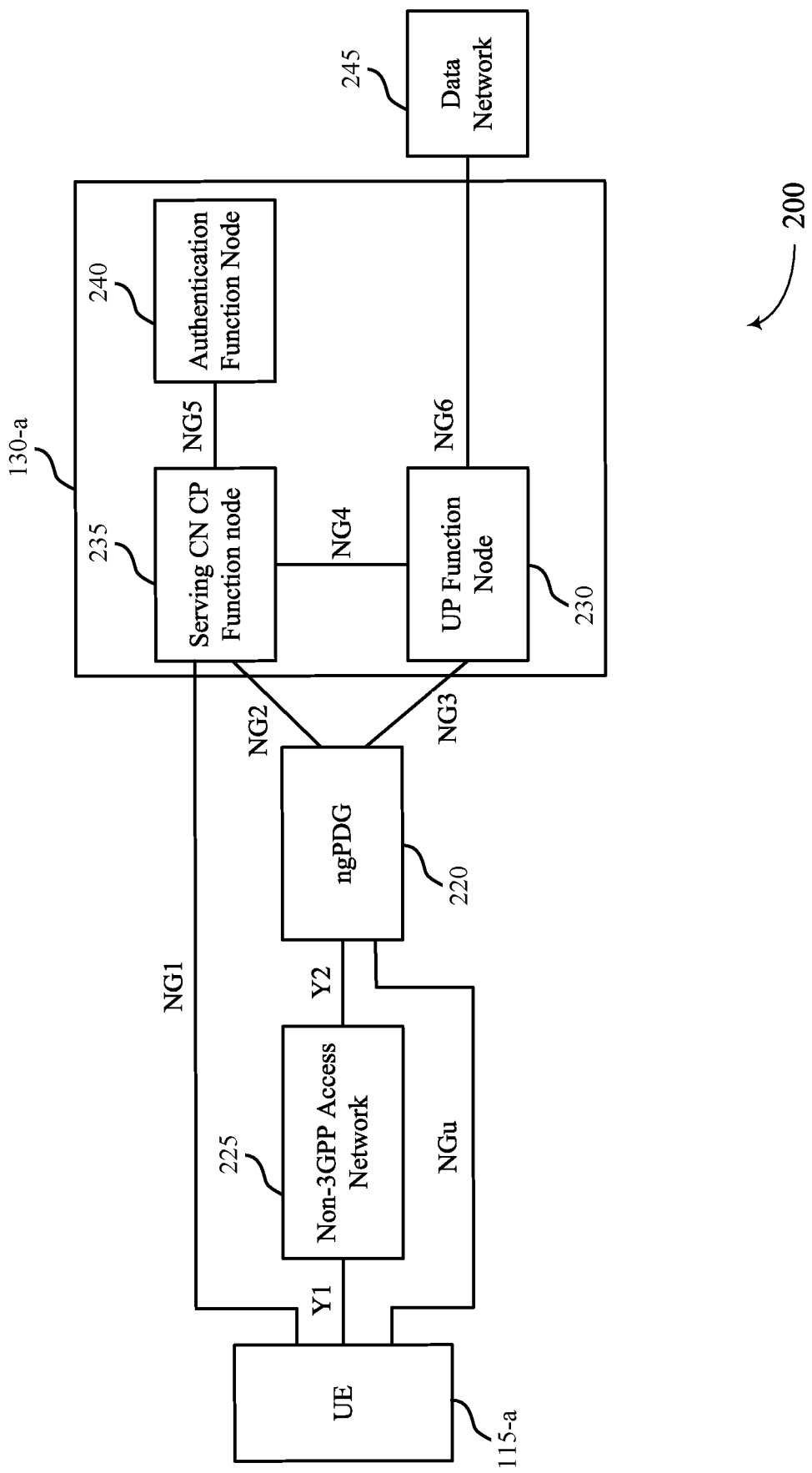
FIG. 2 illustrates an example of a wireless communications system that supports connectivity to a core network via an access network in accordance with one or more aspects of the present disclosure.

FIG. 2 illustrates an example of a wireless communications system 200 that supports connectivity to a core network via an access network in accordance with one or more aspects of the present disclosure. As depicted, the wireless communications system 200 may include UE 115-a, a non-3GPP access network 225 ("access network 225"), a next generation packet data gateway (ngPDG) 220, and a next generation core network (NGC) 130-a. In this example, the access network 225 may be a non-3GPP access network that is not trusted by the NGC 130-a. The core network 130-a may include a core network control plane function (CNCPF) node 235, a user plane function (UPF) node 230, and an authentication function (AUF) node 240. The UPF node 230 may provide connectivity to a data network (DN) 245 via the NGC 130-a. Wireless communications system 200 is an example of wireless communications system 100, UE 115-a is an example of UE 115, NGC 130-a is an example of core network 130, of FIG. 1. In an example, the UE 115-a may be a dual radio that can connect to both a 3GPP radio access network (RAN) and access network 225. For example, the UE 115-a may include a long term evolution (LTE) radio and a WLAN radio.

The wireless communications system 200 may provide the UE 115-a with connectivity to a NGC 130-a via access network 225 whereby the UE 115-a is authenticated when establishing connectivity to ngPDG 220 and not re-authenticated when subsequently attaching to NGC 130-a. Reference point Y1 is an interface between the UE 115-a and the access network 225. For example, the access network 225 may include a WLAN access point with which the UE 215 115-a associates to gain connectivity to the internet via the access network 225.

Reference point Y2 represents an interface between the access network 225 and the ngPDG 220 for the transport of user plane data, control plane data, or both, to and from the UE 115-*a*. NGu represents an interface between the UE 115-*a* and the ngPDG 220 over which a secure tunnel (e.g., an internet protocol security (IPSec) tunnel) may be established during UE authentication or after UE authentication. The secure tunnel may be used for securely exchanging control plane data and user plane data between the UE 115-*a* and the serving CNCPF node 235 via the access network 225 and the ngPDG 220.

NG1 represents an interface between the UE 115-*a* and the serving CNCPF node 235 via a 3GPP RAN. NG2 represents an interface between the ngPDG 220 and the serving CNCPF node 235 for transporting control and user plane signaling. The serving CNCPF node 235 may use the NG2 interface for establishing a secure tunnel between the UE 115-*a* and the ngPDG 220, and for transporting signaling between the UE 115-*a* to the core network 130-*a* when the UE 115-*a* is requesting to attach to the NGC 130-*a*. The serving CNCPF node 235 may further use the NG2 interface to configure the ngPDG 220 during establishment of a session (e.g., a packet data unit (PDU) session) between the DN 245 and the UE 115-*a* via the NGC 130-*a*.

NG3 represents a user plane interface between the ngPDG 220 and the UPF node 230 that provides user plane (UP) functions for transporting user plane data between the UE 115-*a* and DN 245. NG4 may represent an interface between the serving CNCPF node 235 and the UPF node 230. The serving CNCPF node 235 may use the NG4 interface to configure the UPF node 230 for transporting user plane data between the UE 115-*a* and DN 245. NG5 may represent an interface between the serving CNCPF node 235 and the AUF node 240 for authenticating the UE 115-*a*. NG6 may represent an interface between the UPF node 230 and the DN 245 for transporting user plane data between the UE 115-*a* and DN 245.

The ngPDG 220 may provide the UE 115-*a* with connectivity to NGC 130-*a* via access network 225. To do so, the serving CNCPF node 235 may perform an authentication procedure to authenticate the UE 115-*a* via a Serving CN CP Function node 235 and, if successful, may establish a secure tunnel between the UE 115-*a* and the ngPDG 220. In an example, the authentication procedure may utilize the Extensible Authentication Protocol (EAP) that communicates in accordance with the Internet Key Exchange (IKE) protocol (e.g., IKEv2).

Once successfully authenticated, the serving CNCPF node 235 may create a security context for the UE 115-*a*. The serving CNCPF node 235 may use the security context when the UE 115-*a* subsequently initiates an attach procedure for attaching to the NGC 130-*a*. Because the security context indicates that the UE 115-*a* was already successfully authenticated during the UE authentication with the ngPDG 220, the serving CNCPF node 235 does not re-authenticate the UE 115-*a* during the attach procedure. Once attached to the NGC 130-*a*, the UE 115-*a* may establish a session (e.g., a PDU session) for obtaining connectivity to DN 245 via the NGC 130-*a*.

Figure 3:
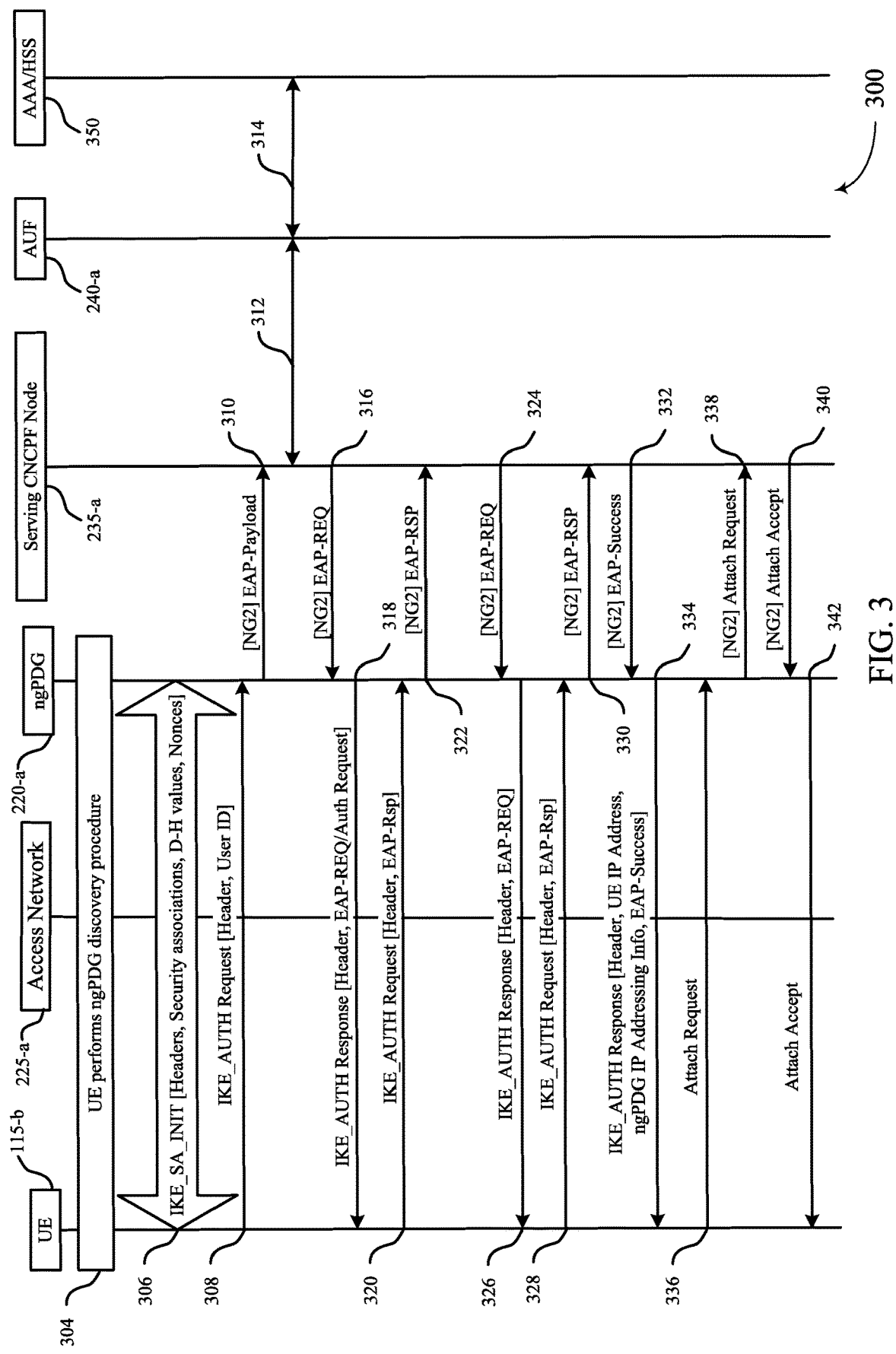
FIG. 3 illustrates an example of a process flow that supports connectivity to a core network via an access network in accordance with one or more aspects of the present disclosure.

FIG. 3 illustrates an example of a process flow 300 that supports connectivity to a core network via an access network in accordance with one or more aspects of the present disclosure. In FIG. 3, UE 115-*b* performs an initial untrusted attach procedure by which a secure tunnel between the UE 115-*b* and the ngPDG 220-*a* is established. As part of the initial untrusted attach procedure, the UE 115-*b* may perform an authentication procedure with serving CNCPF node 235-*a*. In FIG. 3, UE 115-*b* is an example of UEs 115, 115-*a* of FIGS. 1-2, ngPDG 220-*a* is an example of ngPDG 220-*a* of FIG. 2, serving CNCPF node 235-*a* is an example of serving CNCPF node 235 of FIG. 2, AUF node 240-*a* is an example of AUF node 240 of FIG. 2. In FIG. 3, the UE 115-*b* has already established network connectivity (e.g., IP connectivity) with access network 225-*a* via, for example, a WLAN access point and has obtained a network address (e.g., an IP address).

At 304, the UE 115-*b* may use its connectivity to the access network 225-*a* to perform an ngPDG discovery procedure to discover and select a ngPDG. In an example, a network operator may deploy Evolved Packet Data Gateways (ePDGs) in an EPC network and, for the NGC 130-*a*, may deploy gateways that belong only as ngPDGs. The network operator may also modify the ePDGs to support ngPDG functionality and interface to both the EPC network and the NGC 130-*a*. During the discovery procedure, the UE 115-*b* may be permitted to select either a ngPDG or an ePDG that has both ePDG and ngPDG functionality to gain access to the NGC 130-*a*.

The UE 115-*b* may perform ePDG discovery using a domain name service (DNS) query mechanism for identifying a ngPDG or a suitable ePDG that supports ngPDG functionality. A DNS may include a database storing network addresses for each PDG, and what functionality each PDG supports. The NGC 130-*a* may include a DNS, the DNS may be otherwise accessible via access network 225, or the like. In an example, the UE 115-*b* may construct a domain name identifier, such as a FQDN, and perform a DNS query to resolve it. The FQDN may contain an Operator Identifier that uniquely identifies a public land mobile network (PLMN) where a ngPDG (or a suitable ePDG) is located. In an example, an ePDG FQDN may be composed of seven labels. The first two labels are "epdg.epc". The third and fourth labels may together uniquely identify the PLMN. The last three labels may be "pub. 3gppnetwork.org". An example ePDG FQDN is "epdg.epc.mnc<MNC>.mcc<MCC>.pub.3gppnetwork.org". When roaming, the UE 115-*b* may utilize the services of a visited PLMN (VPLMN) and the ePDG FQDN Operator Identifier may be constructed as described above, but using a mobile network code (MNC) and mobile country code (MCC) of the VPLMN.

To ensure that the UE 115-*b* discovers a ngPDG or an ePDG that has ngPDG functionality, the UE 115-*b* may construct the FQDN to identify the ngPDG by adding an indication to the FQDN that the UE 115-*b* is requesting a network address of a ngPDG. The UE 115-*b* may construct an FQDN containing an indication of the type of core network the UE wishes to connect to via an additional "NGC" label (e.g., NGC.epdg.epc.mnc<MNC>.mcc <MCC>.pub.3gppnetwork.org). Additionally or alternatively, the UE 115-*b* can construct an FQDN explicitly indicating an ngPDG (e.g., by replacing the "epdg" label with an "ngpdg" label).

The UE 115-*b* may receive a response to the DNS query from the NGC 130-*a* that contains one or more IP addresses of available ngPDGs, ePDGs having ngPDG functionality, or both. For example, the NGC 130-*a* may reply to the DNS query by providing a list of addresses of ngPDGs and ePDGs that support ngPDG functionality. Additionally or alternatively, the response to the DNS query may contain a list of one or more IP addresses of ngPDGs and/or ePDGs having ngPDG functionality, and one or more IP addresses of ePDGs that do not support ngPDG functionality. For example, the NGC 130-*a* may reply to the DNS query by providing a list of one or more PDGs that each may or may not support ngPDG functionality, along with an indication as to which of the listed PDGs support ngPDG functionality and which of the listed PDGs do not support ngPDG functionality. A UE 115-*b* that can connect both to an ePDG in the EPC and an ngPDG in the NGC determines whether to use the procedures to connect to an ePDG or the procedures to connect an ngPDG based at least in part on the DNS query that the UE 115-*b* provided (e.g., a query for an ePDG or for an ngPDG). If UE 115-*b* is unable to discover an ngPDG while roaming in a VPLMN, the UE 115-*b* may use an ngPDG in a home public land mobile network (HPLMN) (e.g., discovered based at least in part on a DNS query with the labels set to the HPLMN value, or a preconfigured ngPDG address). In the depicted example, the result of the discovery procedure is a network address of ngPDG 220-*a*.

At 306, the UE 115-*b* initiates, with the ngPDG 220-*a*, connectivity with ngPDG 220-*a* over the access network 225 using an internet key exchange (IKE) protocol. In an example, the UE 115-*b* may communicate an IKE_SA_INIT exchange for attaching and establishing connectivity with ngPDG 220-*a* over the access network 225. As part of the IKE protocol, UE 115-*b* and ngPDG 220-*a* may exchange headers, security associations, Diffie Hillman (D-H) values, Nonces, and the like. The UE 115-*b* may utilize the IKE protocol due to the NGC 130-*a* not trusting the access network 225-*a*, such that messages may be securely communicated between the UE 115-*b* and the NGC 130-*a*. As described later, the UE 115-*b* may optionally not utilize the IKE protocol for an access via a trusted non-3GPP access network.

At 308, the UE 115-*b* may send an IKE_AUTH Request to the ngPDG 220-*a* via the access network 225-*a*. The IKE_AUTH Request may include an identity of the UE (e.g., User ID) and a header. The IKE_AUTH Request may also include a request for authenticating the UE 115-*b* for establishing a secure tunnel (e.g., IPSec tunnel) between the UE 115-*b* and the ngPDG 220-*a*. The IKE_AUTH Request may indicate whether the request establishing the secure tunnel is to be interpreted as an implicit attach, or whether the UE 115-*b* will later perform an explicit attach (e.g., via Non-Access Stratum (NAS) signaling). Indicating implicit or explicit attach may enable the NGC 130-*a* to support UEs that may not have a NAS protocol stack, as described further below in detail.

In some examples, the IKE_AUTH Request may not provide any information to identify DN 245 to which the UE 115-*b* seeks to establish connectivity for exchanging user plane data. As described later below, the UE 115-*b* may provide information identifying the DN 245 when establishing the secure tunnel between the UE 115-*b* and the ngPDG 220-*a*. The IKE_AUTH Request may also include one or more EAP fields for initiating an authentication procedure, or the UE 115-*b* may transmit the EAP fields in the other transmissions described below.

At 310, the ngPDG 220-*a* may select a Serving CN CP functionality node, and forward the IKE_AUTH Request including the one or more EAP fields having an EAP payload, to the Serving CNCPF node. Here, the selected Serving CNCPF node is Serving CNCPF node 235-*a*.

At 312, the Serving CNCPF node 235-*a* may process the IKE_AUTH Request. To do so, the Serving CNCPF node 235-*a* may, at 312, retrieve a service subscription profile of the UE 115-*b* from a subscriber database 350 (e.g., a home subscriber server (HSS)) associated with an Authorization and Accounting (AAA) server and, at 314, interact with the AUF node 240-*a* to obtain data to generate an EAP Request. The EAP Request may be used to prompt the UE 115-*b* to respond with information as part of the authentication procedure for authenticating the UE 115-*b*. At 316, the Serving CNCPF node 235-*a* may send the EAP Request to the ngPDG 220-*a*.

At 318, the ngPDG 220-*a* may process the EAP Request and send to the UE 115-*b* an IKE_AUTH Response that includes the EAP request. In an example, the ngPDG 220-*a* may generate an IKE_AUTH response that includes a header and the EAP Request.

At 320, the UE 115-*b* may process the EAP request and send an IKE_AUTH Request to the ngPDG 220-*a*. The IKE_AUTH Request may include a header and an EAP response. At 322, the ngPDG 220-*a* may process the IKE_AUTH Request and forward the EAP response to the Serving CNCPF node 235-*a*.

At 324, the Serving CNCPF node 235-*a* may process the EAP response and generate an authenticate request. In an example, the authenticate request may include an EAP request. The Serving CNCPF node 235-*a* may send the authentication request over the NG2 interface to the ngPDG 220-*a*. At 326, the ngPDG 220-*a* may forward the authentication request to the UE 115-*b*. In an example, the ngPDG 220-*a* may forward the authentication request to the UE 115-*b* over IKEv2 in an IKE_AUTH Response.

At 328, the UE 115-*b* may process the authentication request, compute an authentication response, and send the authentication response to the ngPDG 220-*a*. In an example, the UE 115-*b* may generate an EAP response, encapsulate the EAP response message in an IKEv2 header, and send the encapsulated EAP response to the ngPDG 220-*a*. At 330, the ngPDG 220-*a* may forward the encapsulated authentication response to the Serving CNCPF node 235-*a* for processing.

At 332, the Serving CNCPF node 235-*a* may complete the procedure for authenticating the UE and, if successfully authenticated, transmit an authentication success message to the ngPDG 220-*a*. As part of completing the procedure for authenticating the UE, the Serving CNCPF node 235-*a* may create a security context for setting up a secure tunnel (e.g., an IPSec Tunnel) between the UE 115-*b* and the ngPDG 220-*a*. The security context may include the identity of the UE 115-*b* that the UE 115-*b* provided at 308, an indication that the UE 115-*b* has been successful authenticated, and the service subscription profile of UE 115-*b* that the Serving CNCPF node 235-*a* retrieved from the subscriber database at 312.

The Serving CNCPF node 235-*a* may create the security context even if the UE 115-*b* has not yet sent an attach request for attaching to the NGC 130-*a*. The Serving CNCPF node 235-*a* may forward the security context over NG2 to the ngPDG 220-*a*. The Serving CN node may store the security context, or may forward the security context to the AUF node 240-*a* for storage. In some examples, the Serving CNCPF node 235-*a* may generate a secure token (e.g., a temporary secure token) indicating successful authentication of the UE 115-*b*. In an example, the secure token may be a temporary identity of the UE 115-*b* (e.g., a temporary UE identity). The Serving CNCPF node 235-*a* or the AUF node 240-*a* may provide an EAP message to the UE 115-*b* that includes the secure token. Either the Serving CNCPF node 235-*a* or the AUF node 240-*a*, or both, may store the secure token with the security context of the UE 115-*b*.

At 334, the ngPDG 220-*a* may send an authorization response to the UE 115-*b* indicating successful authentication of UE 115-*b* and that a secure tunnel has been established between the UE 115-*b* and the ngPDG 220-*a*. In an example, the ngPDG 220-*a* may send the authorization response as an EAP response to the UE 115-*b* over IKEv2.

The ngPDG 220-a may encapsulate the EAP response in IKEv2 as an IKE_AUTH Response. The IKE_AUTH Response or the EAP response may include a header and/or a set of control plane addressing information. The IKE_AUTH Response may also include the secure token. The set of control plane addressing information may include, for example, an IP address of the UE 115-b and IP addressing information of the ngPDG 220-a (e.g., specific IP address and/or port number) for exchange of control signaling (e.g., NAS signaling) over IP between the UE 115-b and the ngPDG 220-a.

The set of control plane addressing information may also include an IP address of the ngPDG 220-a that is included in an identification responder (IDr) payload of IKEv2. The ngPDG 220-a may use the IDr payload if hosting multiple identities at a same IP address. The ngPDG 220-a and the Serving CNCPF node 235-a may also establish an NG2 interface instance for the UE 115-b corresponding to the secure tunnel. At this juncture in process flow 300, the authentication procedure is complete and the secure tunnel has been established between the UE 115-b and the ngPDG 220-a. The UE 115-b may subsequently use the secure tunnel in an attach procedure for sending attach signaling to the Serving CNCPF node 235-a via the ngPDG 220-a for establishing connectivity to the NGC 130-a.

In some instances, the UE 115-b may be limited to using the set of control plane addressing information only for transporting control signaling (e.g., Non-Access Stratum (NAS) signaling) between the UE 115-b and the Serving CNCPF node 235-a via the ngPDG 220-a, and not for communicating user plane data. In some examples, the ngPDG 220-a may verify that data sent by the UE 115-b using the set of control plane addressing information is solely for control signaling (e.g., NAS signaling), and not user plane data.

After being authenticated and the secure tunnel being established, the UE 115-b may subsequently initiate an attach procedure for attaching to the NGC 130-a. At 336, the UE 115-b may use the set of control plane addressing information to send an attach request (e.g., a NAS Attach Request) to the Serving CNCPF node 235-a over User Datagram Protocol/Internet Protocol (UDP/IP) via the secure tunnel. In the attach request, the UE 115-b may include either the same identity it provided in the IKE_AUTH request at 308, or the secure token it received at 334.

At 338, the ngPDG 220-a may receive and forward the attach request to the Serving CNCPF node 235-a via the NG2 interface. In some instances, the UE 115-b, the ngPDG 220-a, or both may inform the Serving CNCPF node 235-a the type of access network 225-a to which the UE 115-b is connected. The ngPDG 220-a may, for example, inform the Serving CNCPF node 235-a of the access network type via the NG2 interface in, or together with, the attach request. In another example, the UE 115-b may provide include the access network type of in the attach request. The Serving CNCPF node 235-a may use the access network type to perform mobility management procedures appropriate to the access network 225-a (e.g., avoid paging procedures over untrusted non-3GPP access network).

At 340, the Serving CNCPF node 235-a may verify that a candidate UE has been previously authenticated, and if the candidate UE is the same as UE 115-b, proceeds with the attach procedure without re-authenticating the UE 115-b. The Serving CNCPF node 235-a may consider the UE that sent the attach request a candidate UE until able to confirm that the candidate UE is the same as UE 115-b. In one example, the Serving CNCPF node 235-a may verify with the AUF node 240-a that the candidate UE has been previously successfully authenticated based at least in part on the identity provided by the candidate UE (e.g., the identity of UE 115-b), the secure token, or both, included in the attach request. In another example, the Serving CNCPF node 235-a may verify with the ngPDG 220-a that the UE 115-b has been successfully authenticated based at least in part on the identity of the UE 115-b, the secure token, or both, included in the attach request. In a further example, the Serving CNCPF node 235-a may independently verify that the UE 115-b has been successfully authenticated based at least in part on the identity of the UE 115-b, the secure token, or both, included in the attach request. For example, the AUF 240-a, ngPDG 220-a, Serving CNCPF node 235-a, or any combination thereof, may search a database including security contexts to determine whether the identity of the UE 115-b, the secure token, or both, are included in one of the security contexts indicating that the UE 115-b has previously been successfully authenticated. The Serving CNCPF node 235-a may also retrieve a service subscription profile of the UE 115-b using the identity, the secure token, or both, included in the attach request. If the Serving CNCPF node 235-a is able to use the identity of the UE 115-b, the secure token, or both, to verify that the UE 115-b was previously authenticated, the Serving CNCPF node 235-a may process the attach request without re-authenticating the UE 115-b a second (or subsequent) time. If able to verify that the candidate UE has been previously authenticated, the Serving CNCPF node 235-a may communicate an attach accept message to the ngPDG 220-a. The attach accept may indicates that the UE 115-b has successfully attached to the NGC 130-a. At 342, the ngPDG 220-a may forward the attach accept to the UE 115-b via the secure tunnel.

Once the secure tunnel has been established with the ngPDG 220-a, the UE 115-b may, in some examples, send all of its user plane and control data to the NGC 130-a via the IPSec tunnel, and halt using the NG1 interface for communicating with the NGC 130-a. As noted above, the UE 115-b may be a dual radio having a first radio that uses the NG1 interface for communicating with the Serving CNCPF node 235-a via a 3GPP RAN. Instead of using the NG1 interface, the UE 115-b may exchange any further NG1 signaling with the Serving CNCPF node 235-a over the secure tunnel established with the ngPDG 220-a via the NGu interface. The ngPDG 220-a may then forward the NG1 signaling to the Serving CNCPF node 235-a via the NG2 interface. In an example, NG1 signaling may be transported over UDP/IP in the IPSec tunnel between the UE 115-b and the ngPDG 220-a, using the set of control plane addressing information provided to the UE 115-b by the ngPDG 220-a. The ngPDG 220-a may extract and forward control signaling (e.g., NAS signaling) to the Serving CNCPF node 235-a over the NG2 interface.

Figure 4:
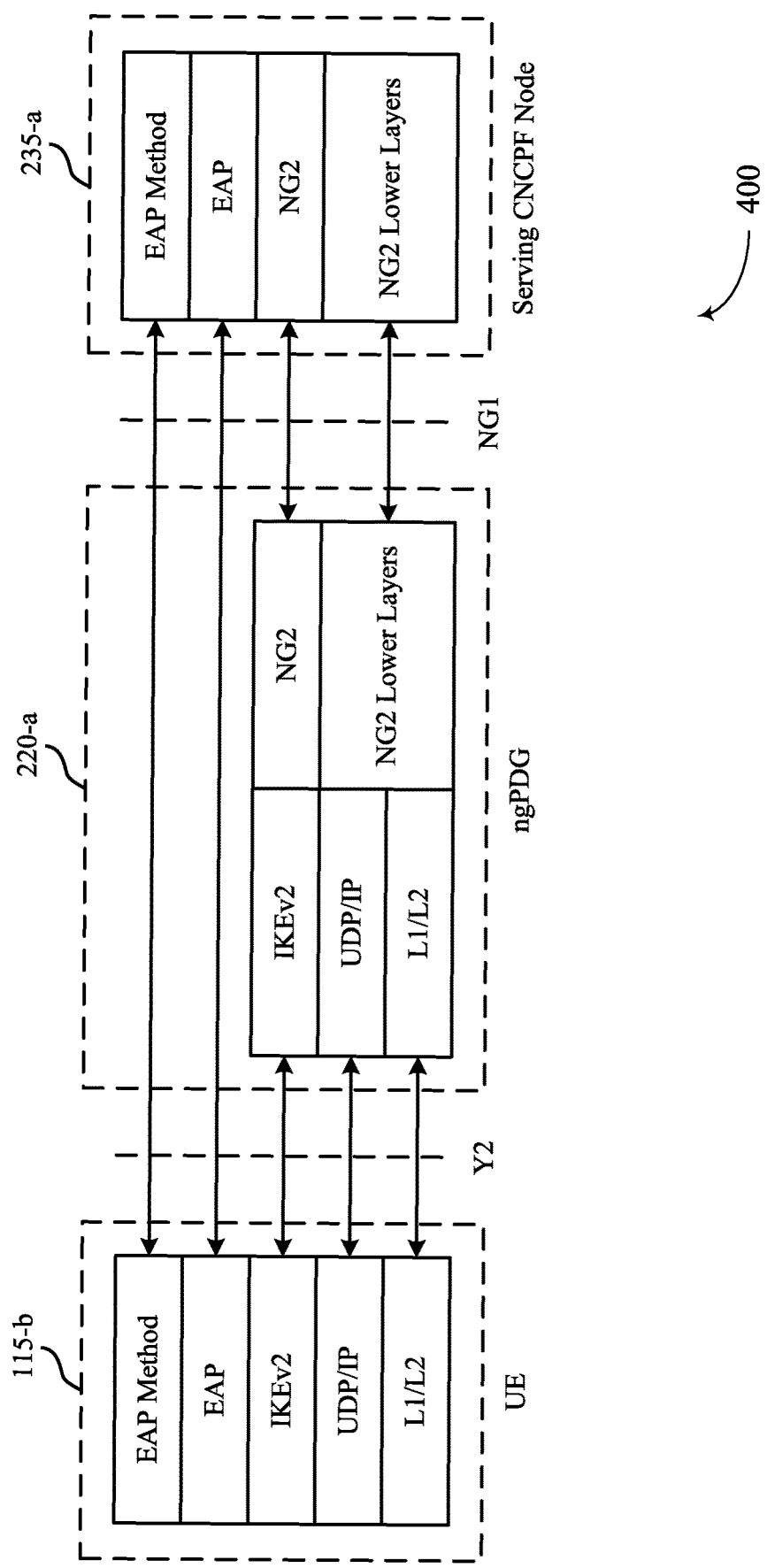
FIG. 4 illustrates an example of a protocol stack that supports connectivity to a core network via an access network in accordance with one or more aspects of the present disclosure.

FIG. 4 illustrates an example of a protocol stack 400 that supports connectivity to a core network via an access network in accordance with one or more aspects of the present disclosure. The protocol stack 400 may correspond to establishing the secure tunnel (e.g., IPSec tunnel) between the UE 115-b and the ngPDG 220-a. As depicted, the Y2 interface may be the interface between the UE 115-b and the ngPDG 220-a via access network 225, and the NG1 interface may be the interface between the ngPDG 220-a and the Serving CNCPF node 235-a.

Figure 5:
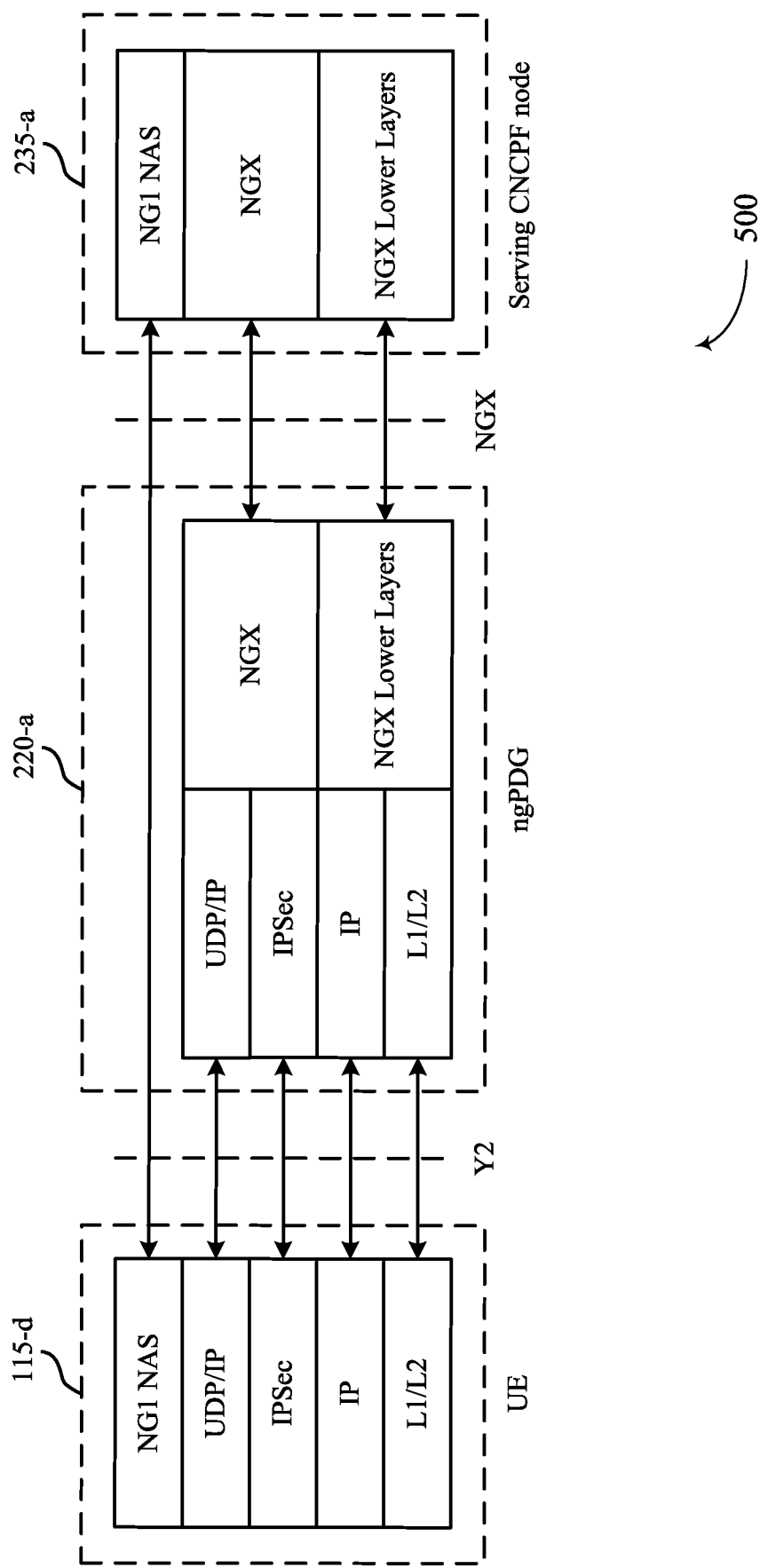
FIG. 5 illustrates an example of a protocol stack that supports connectivity to a core network via an access network in accordance with one or more aspects of the present disclosure.

FIG. 5 illustrates an example of a protocol stack 500 that supports connectivity to a core network via an access network in accordance with one or more aspects of the present disclosure. The protocol stack 500 may correspond to the attach procedure performed between the UE 115-*b* and the Serving CNCPF node 235-*a*. As depicted, the Y2 interface may be the interface between the UE 115-*b* and the ngPDG 220-*a* via access network 225, and the NGX interface may be the interface between the ngPDG 220-*a* and the Serving CNCPF node 235-*a*. The NGX may represent, for example, the NG2 interface between the ngPDG 220-*a* and the Serving CNCPF node 235-*a*. In other examples, the NGX may represent the NG1 interface. In an example, the protocol stack 500 may be used for transporting NG1 control signaling (e.g., NAS signaling) between the UE 115-*b* and the Serving CNCPF node 235-*a*.

Once successfully attached to the NGC 130-*a*, the UE 115-*b* may request to establish a session via the NGC 130-*a*, as described below in further detail.

Figure 6:
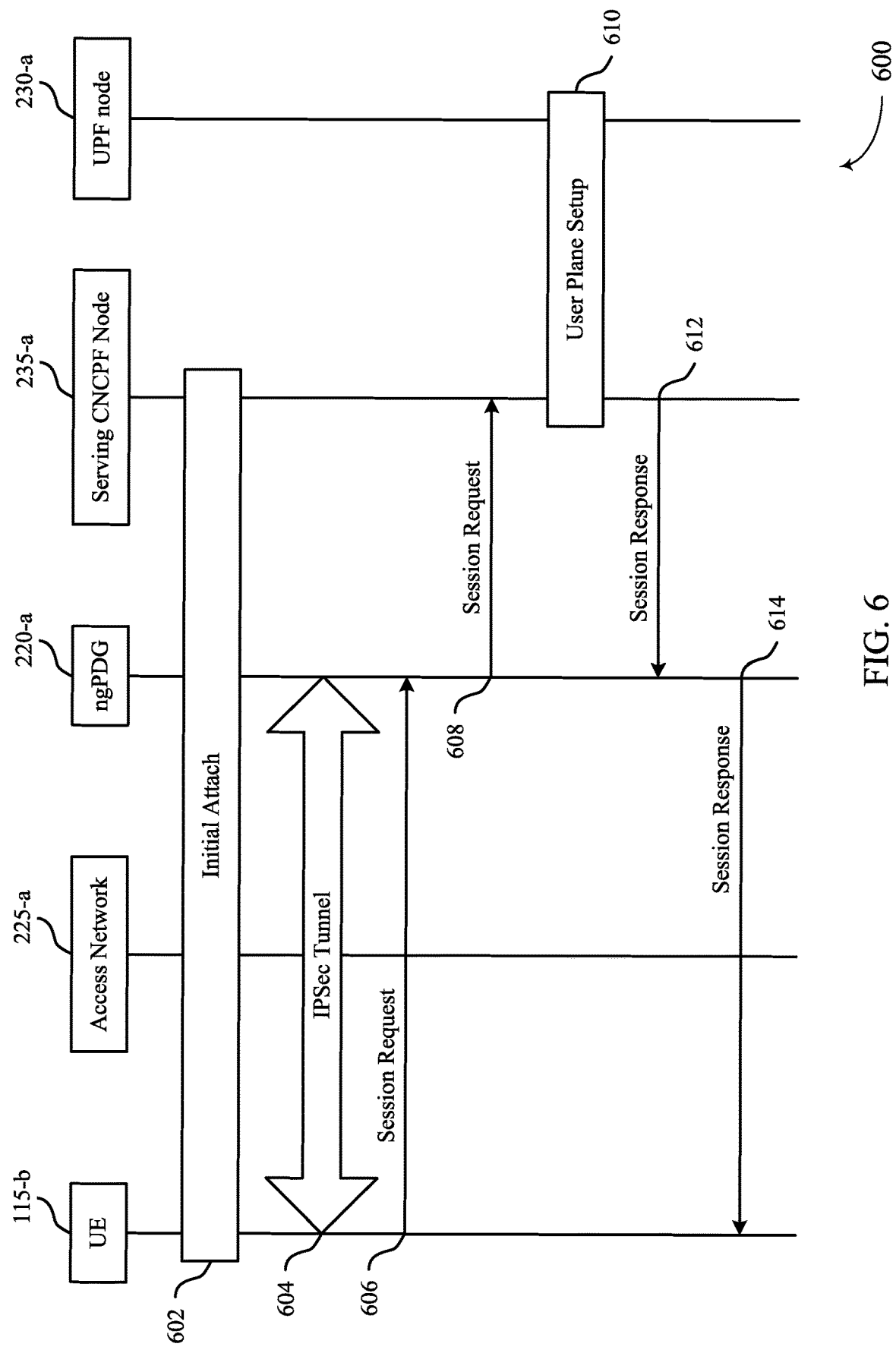
FIG. 6 illustrates an example of a process flow that supports connectivity to a core network via an access network in accordance with one or more aspects of the present disclosure.

FIG. 6 illustrates an example of a process flow 600 that supports connectivity to a core network via an access network in accordance with one or more aspects of the present disclosure. Subsequent control signaling (e.g., NAS signaling) for session establishment (e.g., PDU session) may be transported over UDP and IP in the secure tunnel (e.g., IPSec tunnel). The UE 115-*b* may use the set of control plane addressing information addresses provided by the ngPDG 220-*a* at 334 in FIG. 3 for transporting the control signaling via the secure tunnel. The ngPDG 220-*a* may extract the control signaling received via the secure tunnel and forward, over the NG2 interface, the extracted control signaling to the Serving CNCPF node 235-*a* selected during the attach procedure of FIG. 3.

At 602, the UE 115-*b* may perform the initial untrusted attach procedure with NGC 130-*a* via access network 225-*a*, ngPDG 220-*a*, and Serving CNCPF node 235-*a*, as described in FIG. 3. As part of the initial untrusted attach procedure, an IPSec tunnel 604 may be established between the UE 115-*b* and the ngPDG 220-*a* via access network 225-*a*.

At 606, the UE 115-*b* may initiate a session establishment procedure by sending a session request message (e.g., PDU session request message) via the IPSec tunnel 604 to the ngPDG 220-*a* using UDP/IP. The session request message may use the set of control plane addressing information obtained at 334 of the initial untrusted attach procedure to send the session request message via IPSec tunnel 604. The UE 115-*b* may encapsulate the session request message in an IPSec packet for transport via IPSec tunnel 604.

At 608, the ngPDG 220-*a* may decapsulate the session request message to obtain a control message (e.g., NAS message), and forward the control message to the Serving CNCPF node 235-*a* via the NG2 interface. The ngPDG 220-*a* may also include in the control message an IP address of the ngPDG 220-*a* to indicate a tunnel termination point of the session for a user plane tunnel to be established between the ngPDG 220-*a* and the UPF node 230-*a*. The user plane tunnel may be used to communicate user plane data of the session between the ngPDG 220-*a* and the UPF node 230-*a*. In some examples, the ngPDG 220-*a* may be unaware of the content of the control message. The ngPDG 220-*a* may, however, assign the IP address for the tunnel termination point anyway, and forward the control message and the IP address to the Serving CNCPF node 235-*a*. When the session establishment procedure completes, if the ngPDG 220-*a* does not receive from the Serving CNCPF node 235-*a* user plane information for setting up user plane (UP) functions, the ngPDG 220-*a* may release the allocated IP address.

At 610, the Serving CNCPF node 235-*a* may select a UPF node and perform user plane setup with the selected UPF node (here UPF node 230-*a*) via the NG4 interface. User plane setup may establish the user plane tunnel between UPF node 230-*a* and ngPDG 220-*a* for tunneling user plane data between the UE 115-*b* and DN 245. User plane setup may include retrieving an IP address of the UPF node 230-*a* to be used as a termination address for one end of the user plane tunnel, providing to the UPF node 230-*a* the IP address of the ngPDG 220-*a* as the other end of the user plane tunnel, and assigning one or more IP address(es) to the UE 115-*b* for the session being established.

At 612, the Serving CNCPF node 235-*a* may send a session response message to the ngPDG 220-*a* over the NG2 interface that includes the one or more IP address(es) assigned to the UE 115-*b*. The Serving CNCPF node 235-*a* may also provide to the ngPDG 220-*a* the one or more IP address(es) assigned to the UE 115-*b* and the IP address of the UPF node 230-*a* to be used as a termination address for one end of the user plane tunnel.

At 614, the ngPDG 220-*a* may encapsulate the session response message for communication in an IPSec packet and forward to the UE 115-*b* the encapsulated session response message over UDP/IP via the IPSec tunnel 604. The encapsulated session response message may include the one or more IP address(es) assigned to the UE 115-*b* for the session. The ngPDG 220-*a* may also trigger UE 115-*b* to establish a child security association (child SA) associated with the one or more IP address(es) assigned to the UE 115-*b*, the IP address of the UPF node 230-*a* to be used as a termination address for one end of the user plane tunnel. In response to the trigger, the UE 115-*b* may associate the one or more IP address(es) allocated to the UE 115-*b* for the session with the child SA.

The UE 115-*b* may use the one or more assigned IP address(es), instead of the set of control plane addressing information, for transport of user plane data of the session to the ngPDG 220-*a* via the IPSec tunnel 604. In an example, the ngPDG 220-*a* may receive user plane data of the session via a child SA associated with the data session, and select the UPF node 230-*a* associated with the data session based at least in part on the child SA used by the UE 115-*b*. The ngPDG 220-*a* may route user plane data of the session via the user plane tunnel from the UE 115-*b* to the termination address of UPF node 230-*a*, which may feed the received user plane data of the session to the DN 245 via NG6 interface. In the other direction, the UPF node 230-*a* may receive user plane data of the session from the DN 245 via NG6 interface that has the one or more assigned IP address(es) of UE 115-*b*. The UPF node 230-*a* may use the termination address of ngPDG 220-*a* to route the received user plane data to the ngPDG 220-*a*. The ngPDG 220-*a* may then select the child-SA associated with the address of the UPF-610 and the IP address(es) allocated to the UE 115-*b*. The ngPDG 220-*a* may then forward the received user plane data of the session to the UE 115-*b* via the IPSec tunnel 604.

Figure 7:
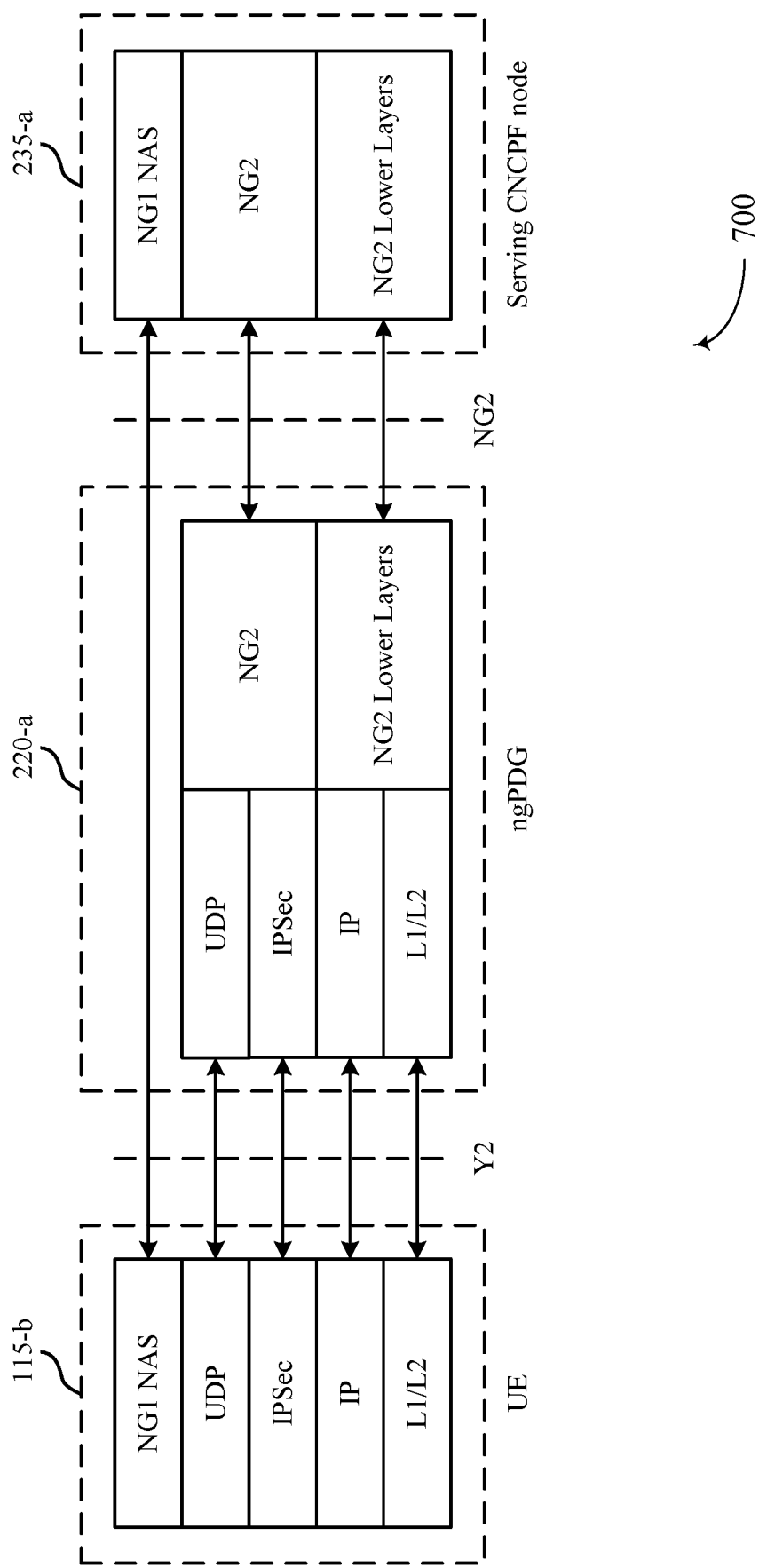
FIG. 7 illustrates an example of a protocol stack that supports connectivity to a core network via an access network in accordance with one or more aspects of the present disclosure.

FIG. 7 illustrates an example of a protocol stack 700 that supports connectivity to a core network via an access network in accordance with one or more aspects of the present disclosure. The protocol stack 700 may be used for establishment of a session between the UE 115-*b* and the Serving CNCPF node 235-*a*. As depicted, the Y2 interface may be the interface between the UE 115-*b* and the ngPDG 220-*a* via access network 225, and the NG2 interface may be the interface between the ngPDG 220-*a* and the Serving CNCPF node 235-*a*. In an example, the protocol stack 500 may be used for transporting NG1 control signaling (e.g., NAS signaling) between the UE 115-*b* and the Serving CNCPF node 235-*a*.

The examples provided above describe providing connectivity to NGC 130-*a* via an untrusted non-3GPP access network. These examples may also be used for trusted non-3GPP access networks and trusted non-3GPP accesses (e.g., a Non 3GPP Interworking Function (N3IWF)). To do so, the ngPDG 220-*a* may be replaced with a generic Trusted non-3GPP (TN3) gateway that is deployed in a trusted non-3GPP access network (e.g., in a WLAN access point or connected to a set of WLAN access points and serving the set of WLAN access points). The UE 115-*b* may perform an authentication procedure with the NGC 130-*a* using EAP (as in the case of untrusted non-3GPP) via the TN3 gateway, which operates an EAP proxy, without using IKEv2 since EAP is natively supported by the non-3GPP access. The type of EAP method supported may depend on the specific non-3GPP access. For example, WLAN can support several EAP methods, including EAP methods specific to 3GPP. During authentication, the TN3 gateway may assign the UE 115-*b* an IP address and inform the UE 115-*b* pf an IP address and port number of the TN3 gateway, in the same manner that the ngPDG 220-*a* provides the set of control information to the UE 115-*b* for the untrusted non-3GPP access.

Upon successful authentication with the NGC 130-*a* via the TN3 gateway, if the non-3GPP has security over the access network 225-*a*, the UE 115-*b* may send control signaling (e.g., NAS signaling) using the addressing information provided by the TN3 gateway. Otherwise, if the non-3GPP has no security over the access network 225-*a* or if the UE 115-*b* is configured by the NGC 130-*a* to use a secure tunnel, the UE 115-*b* may establish a secure tunnel between the UE 115-*b* and the TN3 gateway using security material previously generated in the UE 115-*b* and TN3 gateway as a result of the successful EAP authentication. Afterwards, the UE 115-*b* may send control signaling (e.g., NAS signaling) using the addressing information provided by the TN3 gateway.

Apart from such differences, the TN3 gateway and the other core network functions (e.g., the CN CP function) may implement the same or similar functionality as described for the untrusted non-3GPP access network, and hence the examples described herein may be used to provide connectivity to a NGC via trusted and untrusted non-3GPP access networks.

The examples described herein may also apply to UEs lacking NAS protocol support. In an example, the UE 115-*b* may establish a secure tunnel (e.g., the IPSec tunnel between the UE 115-*b* and the ngPDG 220-*a* in case of untrusted non-3GPP access) with the NGC 130-*a* and provide an indication (e.g., in the EAP messages if EAP is used for the UE 115-*b* authentication) of whether the UE 115-*b* establishment of the secure tunnel is to be interpreted by the NGC 130-*a* as an implicit attach, or whether the UE 115-*b* will perform an explicit attach later (e.g., via NAS signaling). A UE 115-*b* that lacks NAS protocol support indicates that establishment of the secure tunnel shall be interpreted by the NGC 130-*a* as an implicit attach. Such UE 115-*b* may or may not provide the identity of DN 245 (e.g., Data Network Name or Access Point Name) to which the UE 115-*b* wishes to connect in the EAP messages to the NGC 130-*a*.

Upon receiving indication of an implicit attach, the Serving CNCPF node 235-*a* may authenticate the UE 115-*b* and create a security context in the NGC 130-*a* indicating that the UE 115-*b* is attached (e.g., create a mobility management context), and proceed with the procedures described in above for an untrusted or trusted non-3GPP access network without expecting any NAS signaling from the UE 115-*b*.

Moreover, upon receiving indication of an implicit attach, the Serving CNCPF node 235-*a* may establish user plane connectivity to either a data network indicated by the UE 115-*b* (e.g., to DN 245), a default data network based at least in part on network policies, or a data network indicated in the service subscription profile of the UE 115-*b*. The Serving CNCPF node 235-*a* may also, upon receiving a request for authenticating UE 115-*b* (e.g., during the secure tunnel establishment), process the service subscription profile to determine that the UE 115-*b* does not support a NAS protocol and/or that the authentication of the UE 115-*b* represents an implicit attach procedure. The Serving CNCPF node 235-*a* may establish user plane connectivity to either a date network that the UE 115-*b* may have explicitly indicated in EAP messages (e.g., DN 245), a default data network based at least in part on network policies, or a data network indicated in the service subscription profile of the UE 115-*b*.

Beneficially, the examples described herein may provide a mechanism for a UE to connect to a core network via trusted and untrusted access networks. One advantage of the techniques described herein is that the core network may authenticate the UE during secure tunnel establishment without re-authenticating the UE during a subsequent attachment to the core network using the established secure tunnel.

Figure 8:
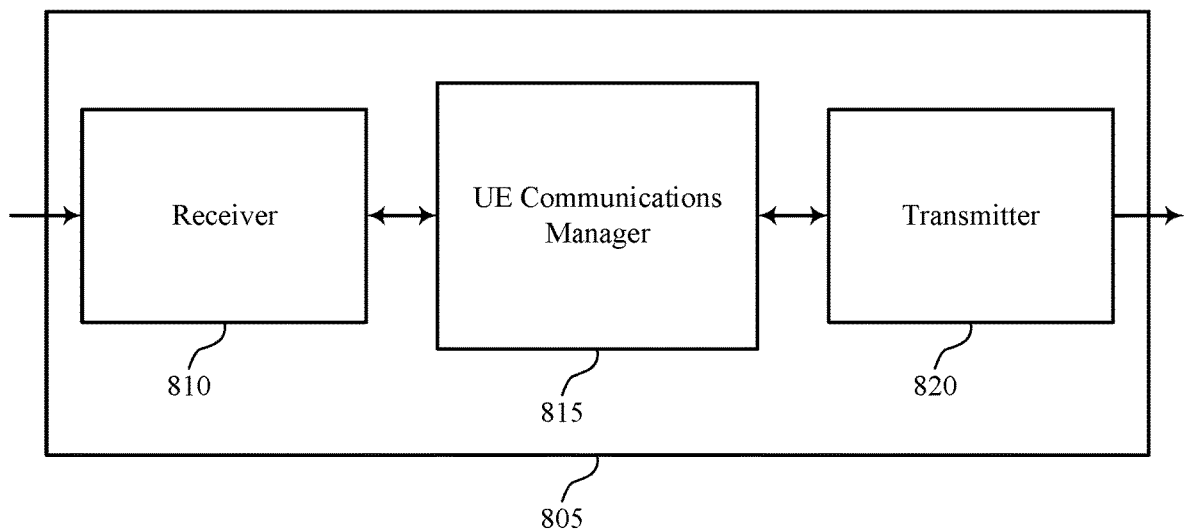
FIGS. 8 through 10 show diagrams of devices that support connectivity to a core network via an access network in accordance with one or more aspects of the present disclosure.

FIG. 8 shows a diagram 800 of a device 805 that supports connectivity to a core network via an access network in accordance with one or more aspects of the present disclosure. Device 805 may be an example of aspects of a UE 115 as described with reference to FIG. 1. Device 805 may include receiver 810, UE communications manager 815, and transmitter 820. Device 805 may also include a processor. Each of these components may be in communication with one another (e.g., via one or more buses).

Receiver 810 may receive information such as packets, user data, or control information associated with various information channels (e.g., control channels, data channels, and information related to connectivity to a core network via an access network, etc.). Information may be passed on to other components of the device. The receiver 810 may be an example of aspects of the transceiver 1135 described with reference to FIG. 11. Receiver 810 may utilize a single antenna or a set of antennas.

UE communications manager 815 may be an example of aspects of the UE communications manager 1115 described with reference to FIG. 11. UE communications manager 815 and/or at least some of its various sub-components may be implemented in hardware, software executed by a processor, firmware, or any combination thereof. If implemented in software executed by a processor, the functions of the UE communications manager 815 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. UE communications manager 815 and/or at least some of its various sub-components may be physically located at various positions, including being distributed such that portions of functions are implemented at different physical locations by one or more physical devices. In some examples, UE communications manager 815 and/or at least some of its various sub-components may be a separate and distinct component in accordance with various aspects of the present disclosure. In other examples, UE communications manager 815 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 815 may generate a discovery query for discovering a PDG that provides connectivity to a core network via a core network node, the discovery query including an identifier specifying a first type of PDG of a set of different types of PDGs, the first type of PDG supporting a defined functionality, transmit the discovery query via an access network, and receive, via the access network, a query response identifying at least one PDG that supports the defined functionality. UE communications manager 815 may establish connectivity with an access network, perform, via the access network, a discovery procedure to identify and select a packet data gateway that provides connectivity to a core network via a core network node, perform an authentication procedure with the core network node via the packet data gateway to be authenticated with the core network for establishing connectivity with the packet data gateway, receive a set of control plane addressing information via the packet data gateway based at least in part on the authentication procedure, and perform, by transmitting via the connectivity with the packet data gateway an attach message to the packet data gateway, an attach procedure with the core network node, the transmitting the attach message using the control plane addressing information and the attach procedure being performed without re-authenticating the UE.

Transmitter 820 may transmit signals generated by other components of the device. In some examples, the transmitter 820 may be collocated with a receiver 810 in a transceiver module. For example, the transmitter 820 may be an example of aspects of the transceiver 1135 described with reference to FIG. 11. The transmitter 820 may include a single antenna, or it may include a set of antennas.

Figure 9:
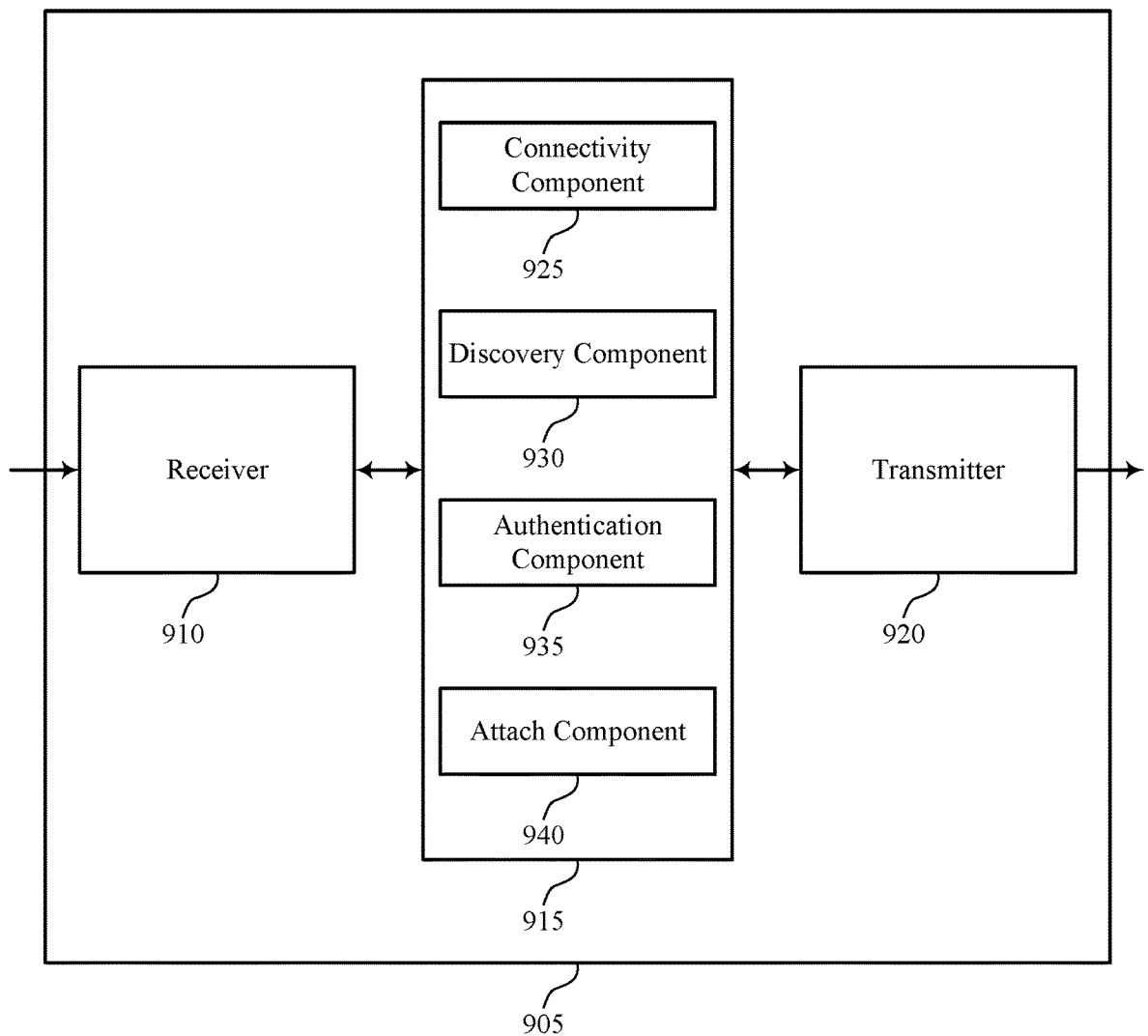

FIG. 9 shows a diagram 900 of a device 905 that supports connectivity to a core network via an access network in accordance with one or more aspects of the present disclosure. Device 905 may be an example of aspects of a device 805 or a UE 115 as described with reference to FIGS. 1 and 8. Device 905 may include receiver 910, UE communications manager 915, and transmitter 920. Device 905 may also include a processor. Each of these components may be in communication with one another (e.g., via one or more buses).

Receiver 910 may receive information such as packets, user data, or control information associated with various information channels (e.g., control channels, data channels, and information related to connectivity to a core network via an access network, etc.). Information may be passed on to other components of the device. The receiver 910 may be an example of aspects of the transceiver 1135 described with reference to FIG. 11. The receiver 910 may utilize a single antenna or a set of antennas.

UE communications manager 915 may be an example of aspects of the UE communications manager 1115 described with reference to FIG. 11. UE communications manager 915 may also include connectivity component 925, discovery component 930, authentication component 935, and attach component 940. Each of these modules may communicate, directly or indirectly, with one another (e.g., via one or more buses).

Connectivity component 925 may transmit the discovery query via an access network, and connectivity component 925 may establish connectivity with an access network.

Discovery component 930 may generate a discovery query for discovering a PDG that provides connectivity to a core network via a core network node, the discovery query including an identifier specifying a first type of PDG of a set of different types of PDGs, the first type of PDG supporting a defined functionality. Discovery component 930 may receive, via the access network, a query response identifying at least one PDG that supports the defined functionality. In some cases, generating the discovery query may include generating a FQDN that includes a label specifying the first type of PDG of the set of different types of PDGs, where the discovery query includes the FQDN. In some cases, discovery component 930 may determine a list of addresses of one or more PDGs of the at least one PDG that each support the defined functionality based on the query response. In some cases, the query response may identify at least one PDG that does not support the defined functionality. In some cases, the discovery query includes a DNS query, the identifier includes a domain name identifier, and the query response includes a DNS response.

Authentication component 935 may perform an authentication procedure with the core network node via the packet data gateway to be authenticated with the core network for establishing connectivity with the packet data gateway and receive a set of control plane addressing information via the packet data gateway based at least in part on the authentication procedure. In some cases, performing the authentication procedure with the core network node via the packet data gateway to be authenticated with the core network for establishing connectivity with the packet data gateway includes establishing an IPSec tunnel with the packet data gateway via the access network.

Attach component 940 may perform, by transmitting via the connectivity with the packet data gateway an attach message to the packet data gateway, an attach procedure with the core network node, the transmitting the attach message using the control plane addressing information and the attach procedure being performed without re-authenticating the UE. In some cases, the attach procedure being performed without re-authenticating the UE is based at least in part on a security context established for the UE during the authentication procedure. In some cases, transmitting the attach message includes transmitting an identifier of the UE in the attach message that is the same as the identifier of the UE used in performing the authentication procedure. In some cases, attach component 940 may receive a token from a core network node based at least in part on the authentication procedure and transmit the token in the attach message as an identifier of the UE.

Transmitter 920 may transmit signals generated by other components of the device. In some examples, the transmitter 920 may be collocated with a receiver 910 in a transceiver module. For example, the transmitter 920 may be an example of aspects of the transceiver 1135 described with reference to FIG. 11. The transmitter 920 may include a single antenna, or it may include a set of antennas.

Figure 10:
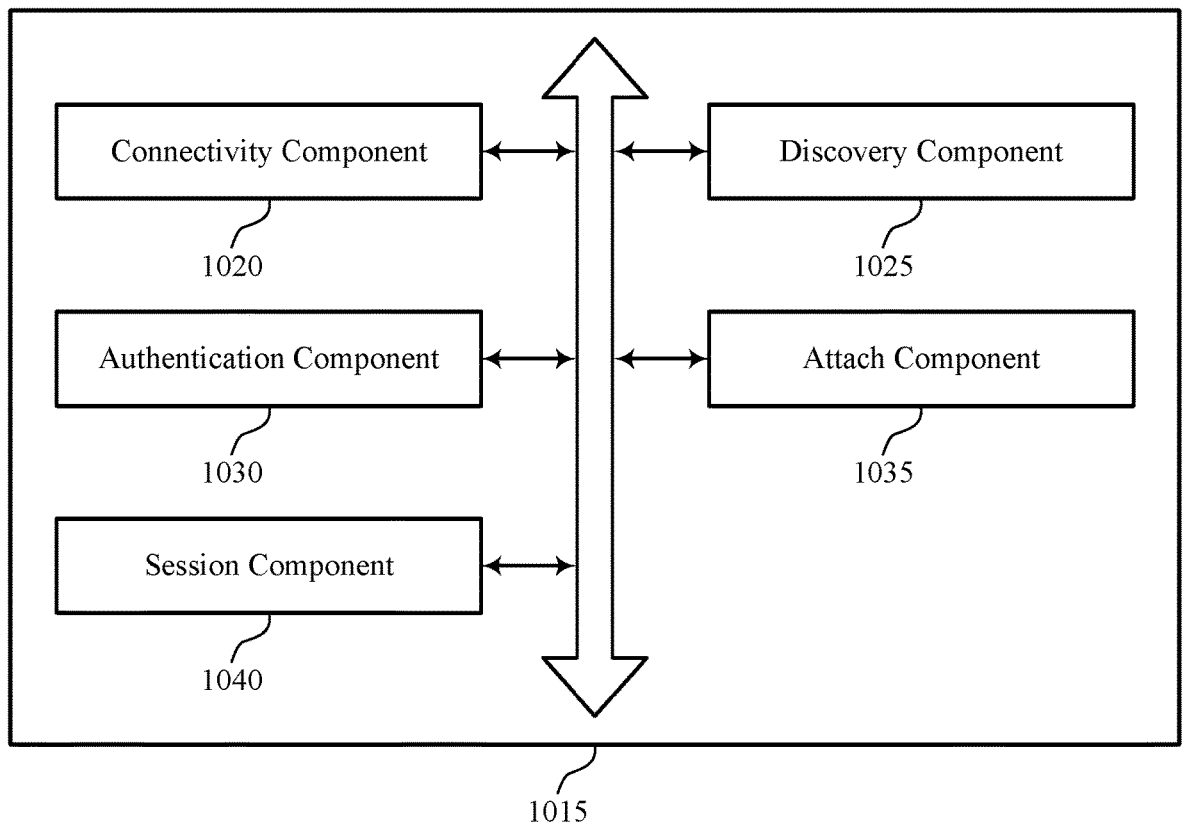

FIG. 10 shows a diagram 1000 of a UE communications manager 1015 that supports connectivity to a core network via an access network in accordance with one or more aspects of the present disclosure. The UE communications manager 1015 may be an example of aspects of a UE communications manager 815, a UE communications manager 915, or a UE communications manager 1115 described with reference to FIGS. 8, 9, and 11. The UE communications manager 1015 may include connectivity component 1020, discovery component 1025, authentication component 1030, attach component 1035, and session component 1040. Each of these modules may communicate, directly or indirectly, with one another (e.g., via one or more buses).

Connectivity component 1020 may transmit the discovery query via an access network, and connectivity component 1020 may establish connectivity with an access network.

Discovery component 1025 may generate a discovery query for discovering a PDG that provides connectivity to a core network via a core network node, the discovery query including an identifier specifying a first type of PDG of a set of different types of PDGs, the first type of PDG supporting a defined functionality, and receive, via the access network, a query response identifying at least one PDG that supports the defined functionality. In some cases, generating the discovery query includes generating a FQDN that includes a label specifying the first type of PDG of the set of different types of PDGs, where the discovery query includes the FQDN, and determine a list of addresses of one or more PDGs of the at least one PDG that each support the defined functionality based on the query response. In some cases, the query response identifies at least one PDG that does not support the defined functionality. In some cases, the discovery query includes a DNS query, the identifier includes a domain name identifier, and the query response includes a DNS response.

Authentication component 1030 may perform an authentication procedure with a core network node via the PDG to be authenticated with the core network for establishing connectivity with the PDG and receive a set of control plane addressing information via the PDG based at least in part on the authentication procedure. In some cases, performing the authentication procedure with the core network node via the PDG to be authenticated with the core network for establishing connectivity with the PDG includes establishing an IPSec tunnel with the PDG via the access network.

Attach component 1035 may transmit an attach message to a first PDG of the at least one PDG via the access network for establishing connectivity with the core network node via the first PDG. Attach component 1035 may receive an attach accept from the core network node via the first PDG and the access network. In some cases, attach component 1035 may perform, by transmitting an attach message to the first PDG using control plane addressing information, an attach procedure with the core network node without re-authentication of the UE. Attach component 1035 may transmit control plane signaling to the core network node via the access network using the control plane addressing information. In some cases, attach component 1035 may receive a token from the core network node based on the authentication procedure, and transmit the token in the attach message as an identifier of the UE. In some cases, the attach message indicates either a secure attachment or implicit attachment. In some cases, the attach message indicates implicit attachment and that the UE does not support NAS signaling. In some cases, the attach procedure is performed without re-authentication of the UE based on a security context established for the UE during an authentication procedure.

Session component 1040 may transmit a session request message via the access network to a first PDG of the at least one PDG and receive a session response message via the access network that includes a network address allocated to the UE for a session with the core network. Session component 1040 may transmit a session request message to the first PDG using the control plane addressing information, the session request message including a request to establish a session with the core network. Transmitting the session request message may include transmitting the session request message over UDP/IP in an IPSec tunnel based on the control plane addressing information. Session component 1040 may receive a session response message including a network address of a user plane for the session. Session component 1040 may establish a security association with the PDG based at least in part on security association trigger received from the PDG, and associate the security association with the session and the network address allocated to the UE for the session.

Figure 11:
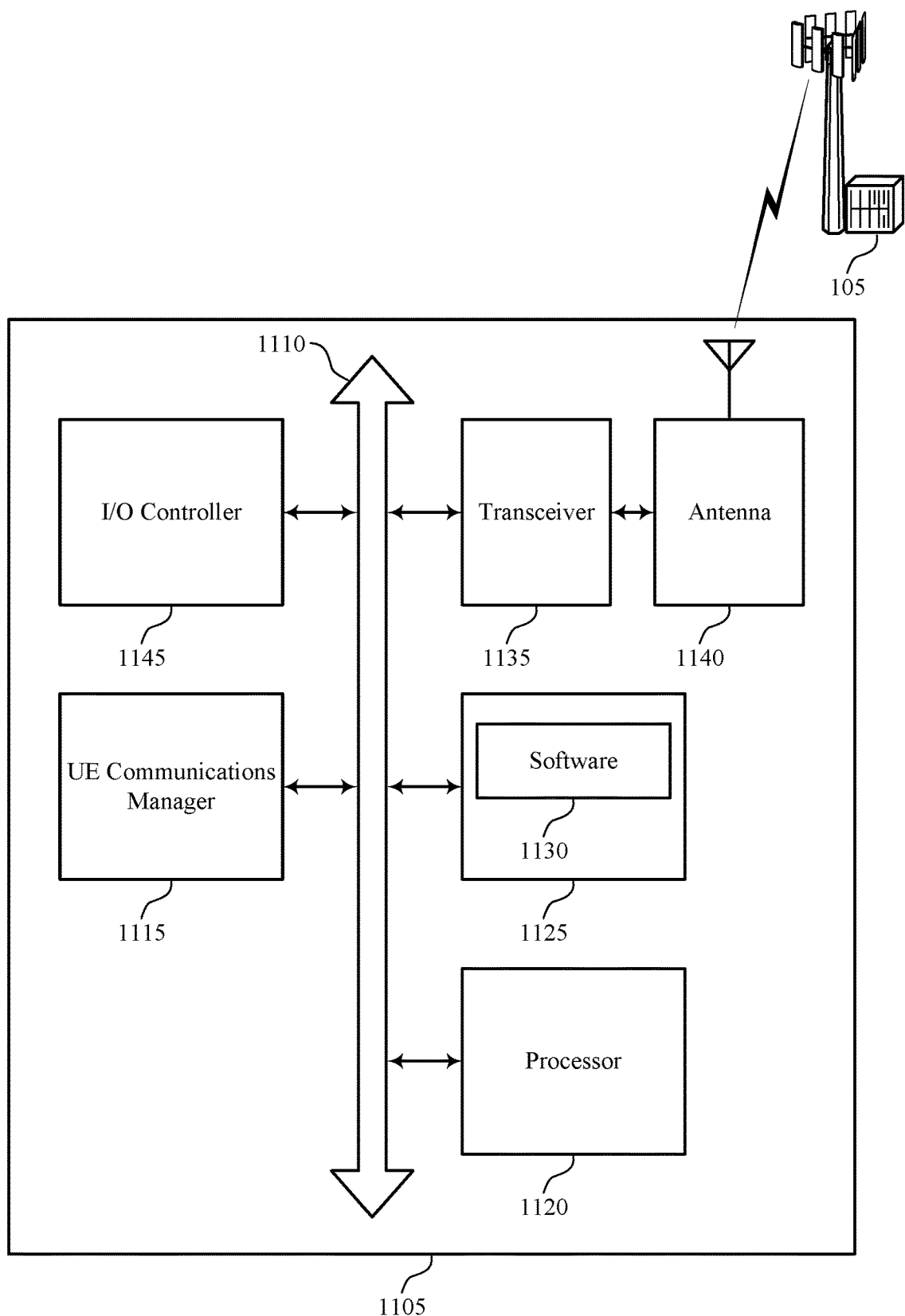
FIG. 11 illustrates a diagram of a system including a device that supports connectivity to a core network via an access network in accordance with one or more aspects of the present disclosure.

FIG. 11 shows a diagram of a system 1100 including a device 1105 that supports connectivity to a core network via an access network in accordance with one or more aspects of the present disclosure. Device 1105 may be an example of or include the components of device 805, device 905, or a UE 115 as described above, e.g., with reference to FIGS. 1, 8 and 9. Device 1105 may include components for bi-directional voice and data communications including components for transmitting and receiving communications, including UE communications manager 1115, processor 1120, memory 1125, software 1130, transceiver 1135, antenna 1140, and I/O controller 1145. These components may be in electronic communication via one or more busses (e.g., bus 1110). Device 1105 may communicate wirelessly with one or more base stations 105.

Processor 1120 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1120 may be configured to operate a memory array using a memory controller. In other cases, a memory controller may be integrated into processor 1120. Processor 1120 may be configured to execute computer-readable instructions stored in a memory to perform various functions (e.g., functions or tasks supporting connectivity to a core network via an access network).

Memory 1125 may include random access memory (RAM) and read only memory (ROM). The memory 1125 may store computer-readable, computer-executable software 1130 including instructions that, when executed, cause the processor to perform various functions described herein. In some cases, the memory 1125 may contain, among other things, a basic input/output system (BIOS) which may control basic hardware and/or software operation such as the interaction with peripheral components or devices.

Software 1130 may include code to implement aspects of the present disclosure, including code to support connectivity to a core network via an access network. Software 1130 may be stored in a non-transitory computer-readable medium such as system memory or other memory. In some cases, the software 1130 may not be directly executable by the processor but may cause a computer (e.g., when compiled and executed) to perform functions described herein.

Transceiver 1135 may communicate bi-directionally, via one or more antennas, wired, or wireless links as described above. For example, the transceiver 1135 may represent a wireless transceiver and may communicate bi-directionally with another wireless transceiver. The transceiver 1135 may also include a modem to modulate the packets and provide the modulated packets to the antennas for transmission, and to demodulate packets received from the antennas.

In some cases, the wireless device may include a single antenna 1140. However, in some cases the device may have more than one antenna 1140, which may be capable of concurrently transmitting or receiving multiple wireless transmissions.

I/O controller 1145 may manage input and output signals for device 1105. I/O controller 1145 may also manage peripherals not integrated into device 1105. In some cases, I/O controller 1145 may represent a physical connection or port to an external peripheral. In some cases, I/O controller 1145 may utilize an operating system such as iOS®, ANDROID®, MS-DOS®, MS-WINDOWS®, OS/2®, UNIX®, LINUX®, or another known operating system. In other cases, I/O controller 1145 may represent or interact with a modem, a keyboard, a mouse, a touchscreen, or a similar device. In some cases, I/O controller 1145 may be implemented as part of a processor. In some cases, a user may interact with device 1105 via I/O controller 1145 or via hardware components controlled by I/O controller 1145.

Figure 12:
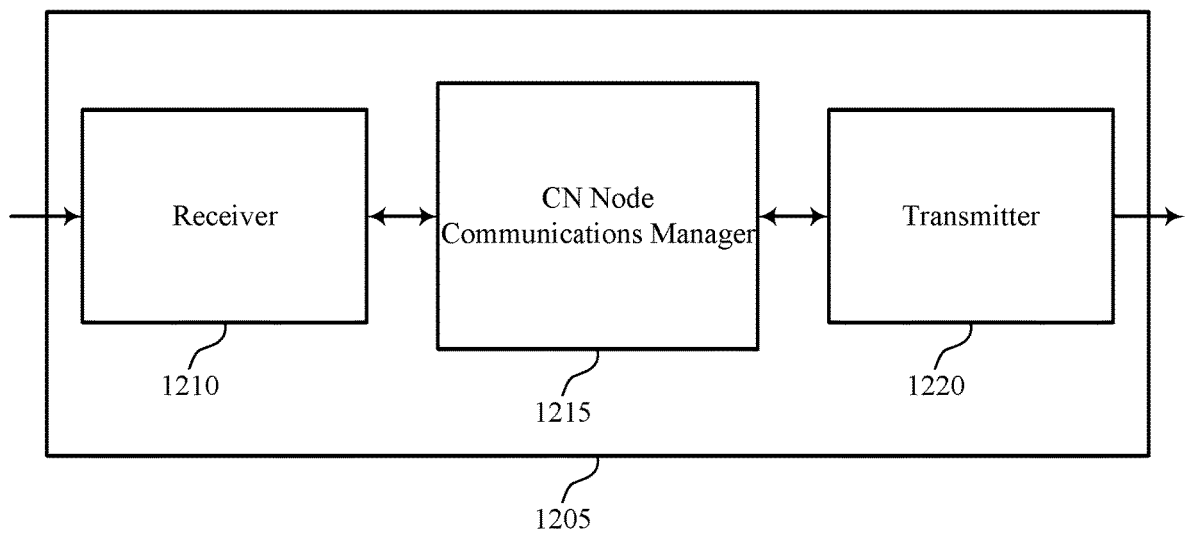
FIGS. 12 through 14 show diagrams of devices that support connectivity to a core network via an access network in accordance with one or more aspects of the present disclosure.

FIG. 12 shows a diagram 1200 of a device 1205 that supports connectivity to a core network via an access network in accordance with one or more aspects of the present disclosure. Device 1205 may be an example of aspects of a core network node (e.g., Serving CNCPF node 235) as described with reference to FIG. 2. Device 1205 may include receiver 1210, core network node communications manager 1215, and transmitter 1220. Device 1205 may also include a processor. Each of these components may be in communication with one another (e.g., via one or more buses).

Receiver 1210 may receive information such as packets, user data, or control information associated with various information channels (e.g., control channels, data channels, and information related to connectivity to a core network via an access network, etc.). Information may be passed on to other components of the device. Receiver 1210 may be an example of aspects of the transceiver 1535 described with reference to FIG. 15. Receiver 1210 may utilize a single antenna or a set of antennas.

Core network node communications manager 1215 may be an example of aspects of the core network node communications manager 1515 described with reference to FIG. 15. Core network node communications manager 1215 and/or at least some of its various sub-components may be implemented in hardware, software executed by a processor, firmware, or any combination thereof. If implemented in software executed by a processor, the functions of core network node communications manager 1215 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. Core network node communications manager 1215 and/or at least some of its various sub-components may be physically located at various positions, including being distributed such that portions of functions are implemented at different physical locations by one or more physical devices. In some examples, core network node communications manager 1215 and/or at least some of its various sub-components may be a separate and distinct component in accordance with various aspects of the present disclosure. In other examples, core network node communications manager 1215 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Core network node communications manager 1215 may perform an authentication procedure to authenticate a UE, create a security context for the authenticated UE, receive an attach message from a PDG that is transmitted by a candidate UE via an access network after performing the authentication procedure, perform an attach procedure based at least in part on receiving the attach message without re-authenticating the candidate UE by processing the security context to verify that the candidate UE corresponds to the authenticated UE, and transmit an attach accept message to the candidate UE via the PDG and via the access network based at least in part on the attach procedure.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1535 described with reference to FIG. 15. The transmitter 1220 may include a single antenna, or it may include a set of antennas.

Figure 13:
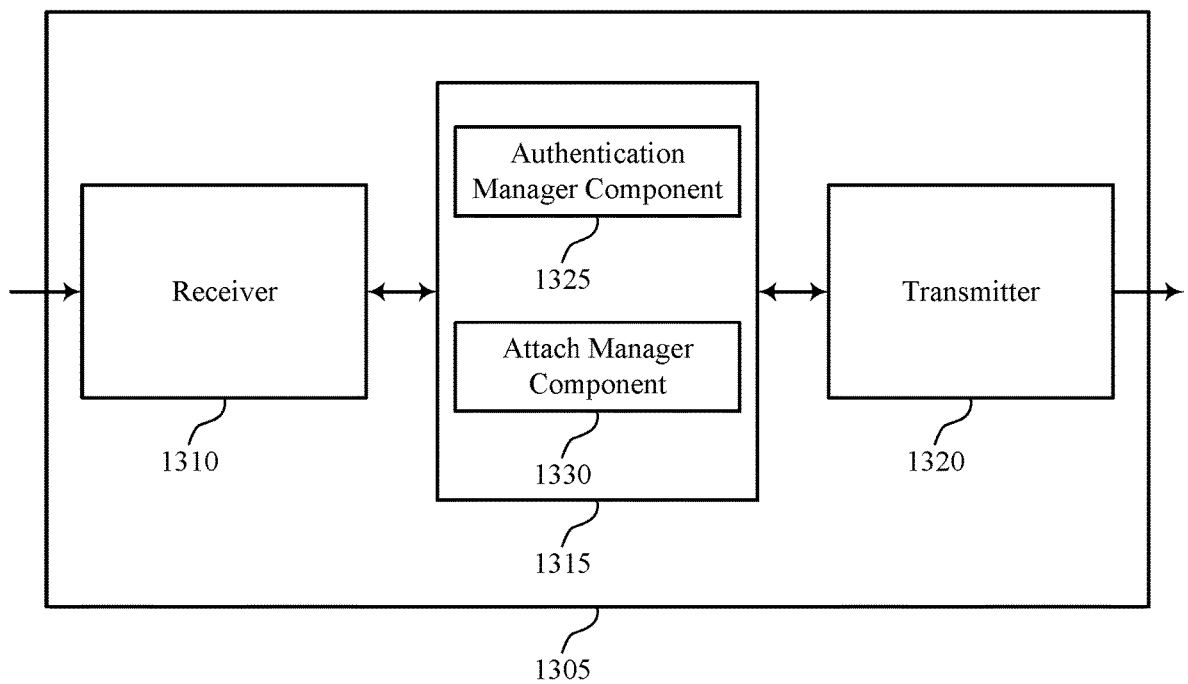

FIG. 13 shows a diagram 1300 of a device 1305 that supports connectivity to a core network via an access network in accordance with one or more aspects of the present disclosure. Device 1305 may be an example of aspects of a device 1205 or a core network node as described with reference to FIGS. 1 and 12. Device 1305 may include receiver 1310, core network node communications manager 1315, and transmitter 1320. Device 1305 may also include a processor. Each of these components may be in communication with one another (e.g., via one or more buses).

Receiver 1310 may receive information such as packets, user data, or control information associated with various information channels (e.g., control channels, data channels, and information related to connectivity to a core network via an access network, etc.). Information may be passed on to other components of the device. Receiver 1310 may be an example of aspects of the transceiver 1535 described with reference to FIG. 15. Receiver 1310 may utilize a single antenna or a set of antennas.

Core network node communications manager 1315 may be an example of aspects of the core network node communications manager 1515 described with reference to FIG. 15. Core network node communications manager 1315 may also include authentication manager component 1325 and attach manager component 1330.

Authentication manager component 1325 may perform an authentication procedure to authenticate a UE, create a security context for the authenticated UE, generate a secure token based at least in part on the authentication procedure successfully authenticating the UE, and transmit the secure token to the authenticated UE via the PDG and via the access network.

Attach manager component 1330 may receive an attach message from a PDG that is transmitted by a candidate UE via an access network after performing the authentication procedure, perform an attach procedure based at least in part on receiving the attach message without re-authenticating the candidate UE by processing the security context to verify that the candidate UE corresponds to the authenticated UE, and transmit an attach accept message to the candidate UE via the PDG and via the access network based at least in part on the attach procedure. In some cases, verifying that the candidate UE corresponds to the authenticated UE includes: retrieving a candidate secure token included in the attach message and verifying that the candidate secure token corresponds to the secure token associated with the authenticated UE. In some cases, attach manager component 1330 may transmit the security context to at least an AUF node, or the PDG, or a combination thereof. In some cases, verifying that the candidate UE corresponds to the authenticated UE includes: requesting that at least an AUF node, or the PDG, or a combination thereof, determine whether a candidate secure token included in the attach message corresponds to the secure token. In some cases, verifying that the candidate UE corresponds to the authenticated UE includes: requesting that at least the AUF node, or the PDG, or a combination thereof, process an identity of the candidate UE included in the attach message to determine whether the candidate UE corresponds to the authenticated UE. In some cases, attach manager component 1330 may determine a type of the access network based on the attach message, and determine a type of the access network based on information received from the PDG.

Transmitter 1320 may transmit signals generated by other components of the device. In some examples, the transmitter 1320 may be collocated with a receiver 1310 in a transceiver module. For example, the transmitter 1320 may be an example of aspects of the transceiver 1535 described with reference to FIG. 15. The transmitter 1320 may include a single antenna, or it may include a set of antennas.

Figure 14:
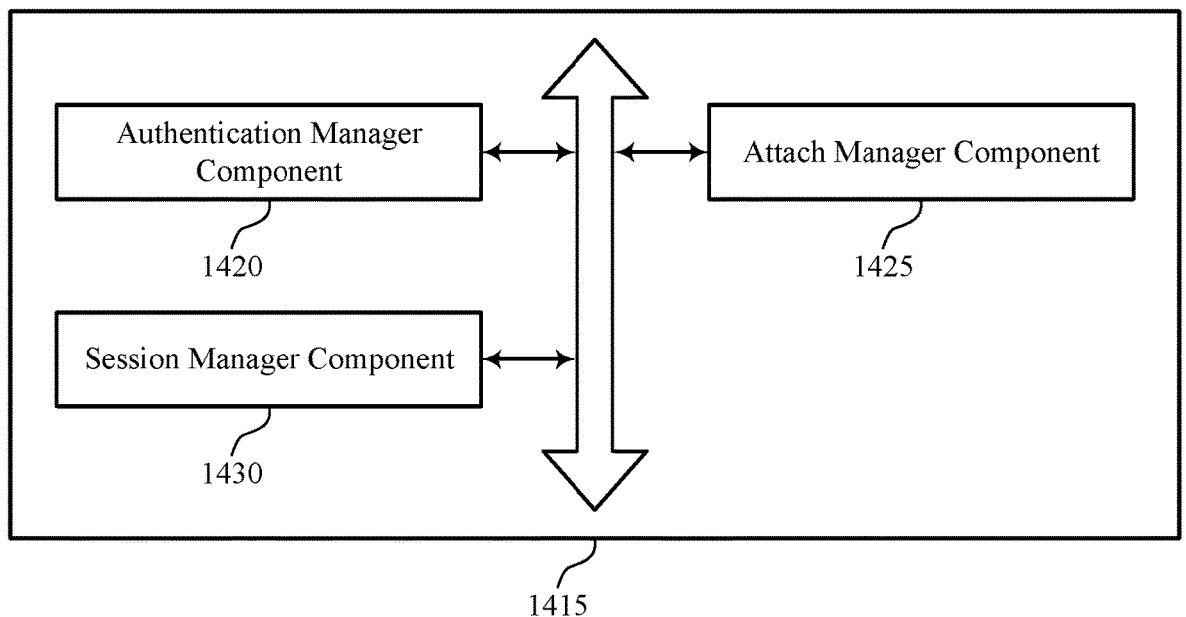

FIG. 14 shows a diagram 1400 of a core network node communications manager 1415 that supports connectivity to a core network via an access network in accordance with one or more aspects of the present disclosure. The core network node communications manager 1415 may be an example of aspects of a core network node communications manager 1515 described with reference to FIGS. 12, 13, and 15. The core network node communications manager 1415 may include authentication manager component 1420, attach manager component 1425, and session manager component 1430. Each of these modules may communicate, directly or indirectly, with one another (e.g., via one or more buses).

Authentication manager component 1420 may perform an authentication procedure to authenticate a UE, create a security context for the authenticated UE, generate a secure token based at least in part on the authentication procedure successfully authenticating the UE, and transmit the secure token to the authenticated UE via the PDG and via the access network.

Attach manager component 1425 may receive an attach message from a PDG that is transmitted by a candidate UE via an access network after performing the authentication procedure, perform an attach procedure based at least in part on receiving the attach message without re-authenticating the candidate UE by processing the security context to verify that the candidate UE corresponds to the authenticated UE, and transmit an attach accept message to the candidate UE via the PDG and via the access network based at least in part on the attach procedure. In some cases, verifying that the candidate UE corresponds to the authenticated UE includes: retrieving a candidate secure token included in the attach message and verifying that the candidate secure token corresponds to the secure token associated with the authenticated UE. In some cases, attach manager component 1425 may transmit the security context to at least an AUF node, or the PDG, or a combination thereof. In some cases, verifying that the candidate UE corresponds to the authenticated UE includes requesting that at least an AUF node, or the PDG, or a combination thereof, determine whether a candidate secure token included in the attach message corresponds to the secure token. In some cases, verifying that the candidate UE corresponds to the authenticated UE includes: requesting that at least the AUF node, or the PDG, or a combination thereof, process an identity of the candidate UE included in the attach message to determine whether the candidate UE corresponds to the authenticated UE. In some cases, attach manager component 1425 may determine a type of the access network based on the attach message, and determine a type of the access network based on information received from the PDG.

Session manager component 1430 may receive a session request from the UE requesting connectivity to the core network, the session request received from the UE via the access network and via the PDG, perform user plane setup with the core network based at least in part on the session request, assign a network address for a session based at least in part on the user plane setup, and provide the assigned network address for the session to the UE via the access network and via the PDG.

Figure 15:
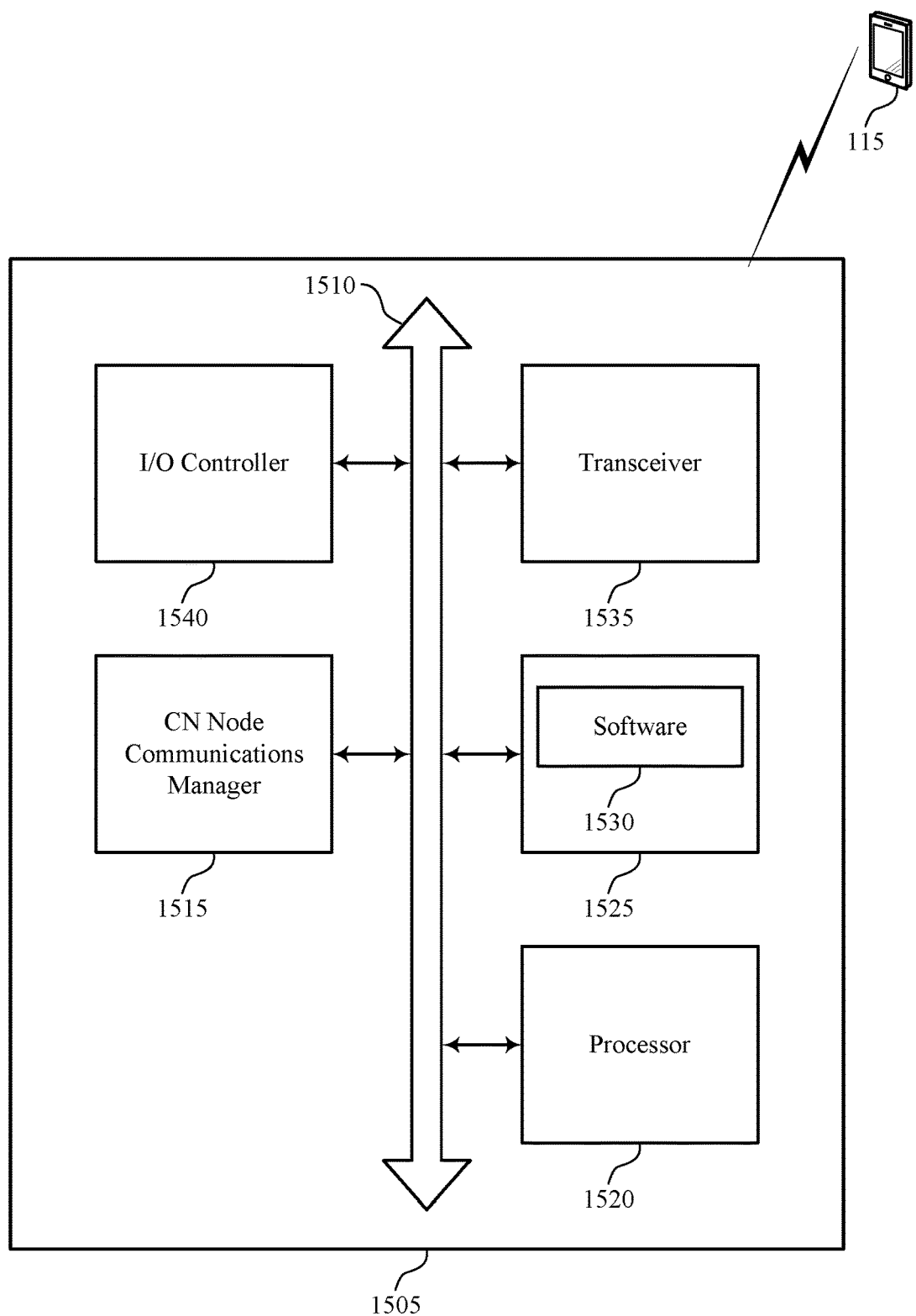
FIG. 15 illustrates a diagram of a system including a device that supports connectivity to a core network via an access network in accordance with one or more aspects of the present disclosure.

FIG. 15 shows a diagram of a system 1500 including a device 1505 that supports connectivity to a core network via an access network in accordance with one or more aspects of the present disclosure. Device 1505 may be an example of or include the components of core network node as described above, e.g., with reference to FIG. 1. Device 1505 may include components for bi-directional voice and data communications including components for transmitting and receiving communications, including core network node communications manager 1515, processor 1520, memory 1525, software 1530, transceiver 1535, and I/O controller 1540. These components may be in electronic communication via one or more busses (e.g., bus 1510).

Processor 1520 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1520 may be configured to operate a memory array using a memory controller. In other cases, a memory controller may be integrated into processor 1520. Processor 1520 may be configured to execute computer-readable instructions stored in a memory to perform various functions (e.g., functions or tasks supporting connectivity to a core network via an access network).

Memory 1525 may include RAM and ROM. The memory 1525 may store computer-readable, computer-executable software 1530 including instructions that, when executed, cause the processor to perform various functions described herein. In some cases, the memory 1525 may contain, among other things, a BIOS which may control basic hardware and/or software operation such as the interaction with peripheral components or devices.

Software 1530 may include code to implement aspects of the present disclosure, including code to support connectivity to a core network via an access network. Software 1530 may be stored in a non-transitory computer-readable medium such as system memory or other memory. In some cases, the software 1530 may not be directly executable by the processor but may cause a computer (e.g., when compiled and executed) to perform functions described herein.

Transceiver 1535 may communicate bi-directionally, via one or more antennas, wired, or wireless links as described above. For example, the transceiver 1535 may represent a wireless transceiver and may communicate bi-directionally with another wireless transceiver. The transceiver 1535 may also include a modem to modulate the packets and provide the modulated packets to the antennas for transmission, and to demodulate packets received from the antennas.

I/O controller 1540 may manage input and output signals for device 1505. I/O controller 1540 may also manage peripherals not integrated into device 1505. In some cases, I/O controller 1540 may represent a physical connection or port to an external peripheral. In some cases, I/O controller 1540 may utilize an operating system such as iOS®, ANDROID®, MS-DOS®, MS-WINDOWS®, OS/2®, UNIX®, LINUX®, or another known operating system. In other cases, I/O controller 1540 may represent or interact with a modem, a keyboard, a mouse, a touchscreen, or a similar device. In some cases, I/O controller 1540 may be implemented as part of a processor. In some cases, a user may interact with device 1505 via I/O controller 1540 or via hardware components controlled by I/O controller 1540.

Figure 16:
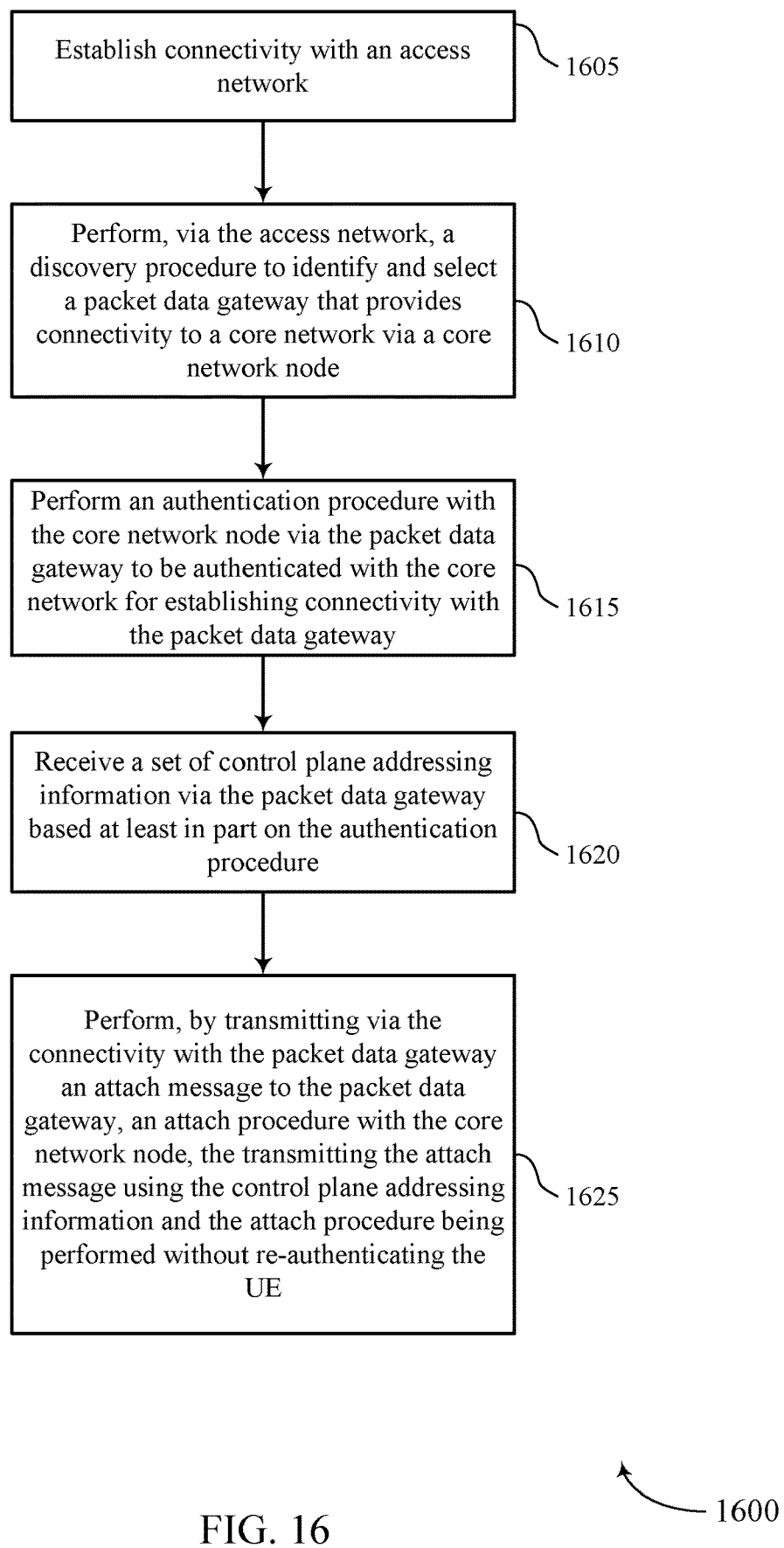
FIGS. 16 through 21 show flowcharts illustrating methods that supports connectivity to a core network via an access network in accordance with one or more aspects of the present disclosure.

FIG. 16 shows a flowchart illustrating a method 1600 that supports connectivity to a core network via an access network in accordance with one or more aspects of the present disclosure. The operations of method 1600 may be implemented by a UE 115 or its components as described herein. For example, the operations of method 1600 may be performed by a UE communications manager as described with reference to FIGS. 8 through 11. In some examples, a UE 115 may execute a set of codes to control the functional elements of the device to perform the functions described below. Additionally or alternatively, the UE 115 may perform aspects the functions described below using special-purpose hardware.

At 1605 the UE 115 may establish connectivity with an access network. The operations at 1605 may be performed according to the methods described with reference to FIGS. 1 through 7. In certain examples, aspects of the operations at 1605 may be performed by a connectivity component as described with reference to FIGS. 8 through 11.

At 1610 the UE 115 may perform, via the access network, a discovery procedure to identify and select a PDG that provides connectivity to a core network via a core network node. The operations at 1610 may be performed according to the methods described with reference to FIGS. 1 through 7. In an example, the discovery procedure may be a DNS query mechanism. In certain examples, aspects of the operations at 1610 may be performed by a discovery component as described with reference to FIGS. 8 through 11.

At 1615 the UE 115 may perform an authentication procedure with the core network node via the PDG to be authenticated with the core network. As a result, the UE 115 may establish connectivity with the PDG. The operations at 1615 may be performed according to the methods described with reference to FIGS. 1 through 7. In certain examples, aspects of the operations at 1615 may be performed by an authentication component as described with reference to FIGS. 8 through 11.

At 1620 the UE 115 may receive a set of control plane addressing information via the PDG based at least in part on the authentication procedure. The operations at 1620 may be performed according to the methods described with reference to FIGS. 1 through 7. In certain examples, aspects of the operations at 1620 may be performed by a authentication component as described with reference to FIGS. 8 through 11.

At 1625 the UE 115 may perform, by transmitting via the connectivity with the PDG an attach message to the PDG, an attach procedure with the core network node, the transmitting the attach message using the control plane addressing information and the attach procedure being performed without re-authenticating the UE. The operations at 1625 may be performed according to the methods described with reference to FIGS. 1 through 7. In certain examples, aspects of the operations at 1625 may be performed by an attach component as described with reference to FIGS. 8 through 11.

Figure 17:
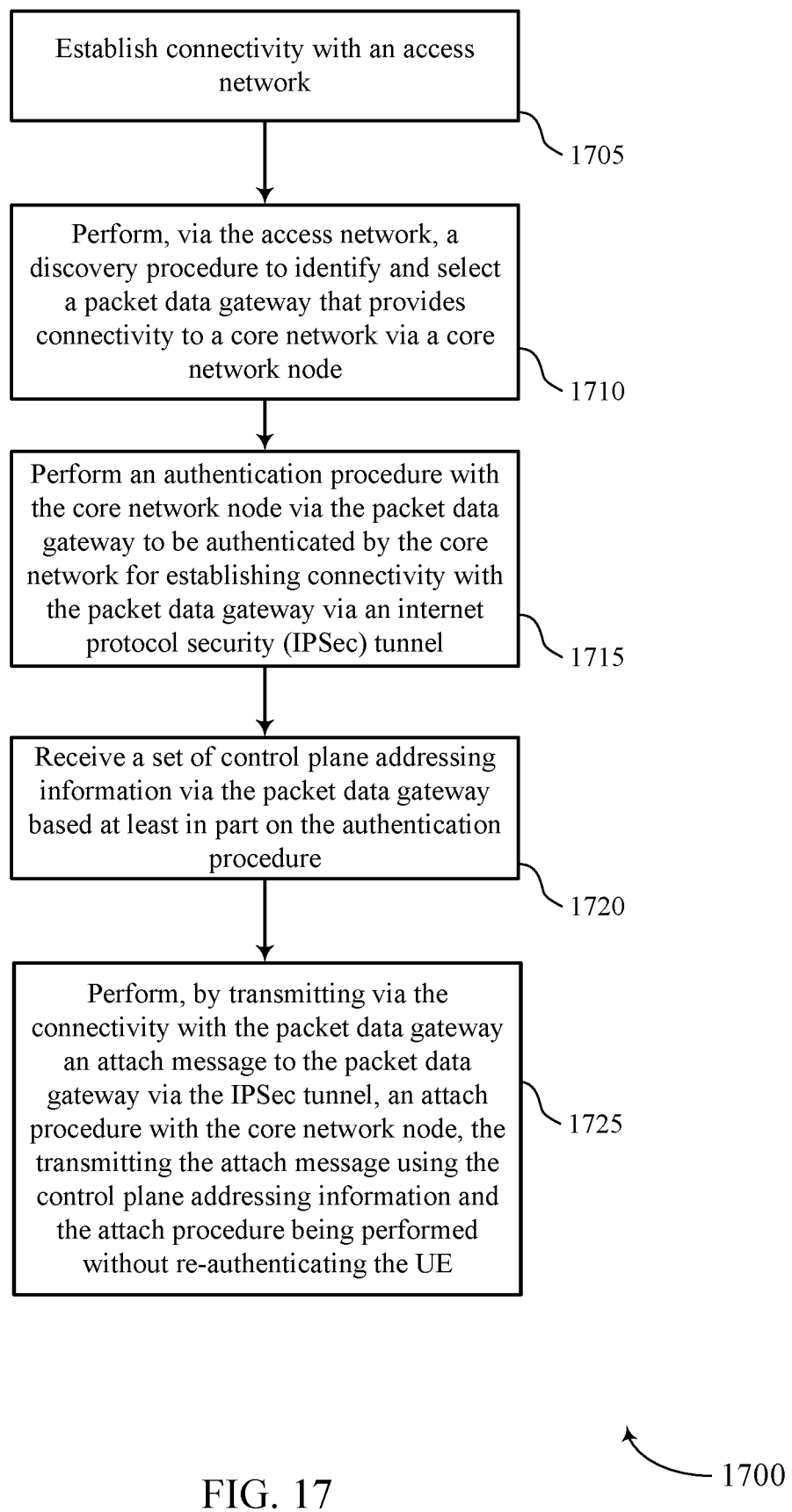

FIG. 17 shows a flowchart illustrating a method 1700 that supports connectivity to a core network via an access network in accordance with one or more aspects of the present disclosure. The operations of method 1700 may be implemented by a UE 115 or its components as described herein. For example, the operations of method 1700 may be performed by a UE communications manager as described with reference to FIGS. 8 through 11. In some examples, a UE 115 may execute a set of codes to control the functional elements of the device to perform the functions described below. Additionally or alternatively, the UE 115 may perform aspects the functions described below using special-purpose hardware.

At 1705 the UE 115 may establish connectivity with an access network. The operations at 1705 may be performed according to the methods described with reference to FIGS. 1 through 7. In certain examples, aspects of the operations at 1705 may be performed by a connectivity component as described with reference to FIGS. 8 through 11.

At 1710 the UE 115 may perform, via the access network, a discovery procedure to identify and select a PDG that provides connectivity to a core network via a core network node. The operations at 1710 may be performed according to the methods described with reference to FIGS. 1 through 7. In certain examples, aspects of the operations at 1710 may be performed by a discovery component as described with reference to FIGS. 8 through 11.

At 1715 the UE 115 may perform an authentication procedure with the core network node via the PDG to be authenticated with the core network for establishing connectivity with the PDG via an IPSec tunnel. The operations at 1715 may be performed according to the methods described with reference to FIGS. 1 through 7. In certain examples, aspects of the operations at 1715 may be performed by a authentication component as described with reference to FIGS. 8 through 11.

At 1720 the UE 115 may receive a set of control plane addressing information via the PDG based at least in part on the authentication procedure. The operations at 1720 may be performed according to the methods described with reference to FIGS. 1 through 7. In certain examples, aspects of the operations at 1720 may be performed by a authentication component as described with reference to FIGS. 8 through 11.

At 1725 the UE 115 may perform, by transmitting via the connectivity with the PDG an attach message to the PDG via the IPSec tunnel, an attach procedure with the core network node, the transmitting the attach message using the control plane addressing information and the attach procedure being performed without re-authenticating the UE. The operations at 1725 may be performed according to the methods described with reference to FIGS. 1 through 7. In certain examples, aspects of the operations at 1725 may be performed by an attach component as described with reference to FIGS. 8 through 11.

Figure 18:
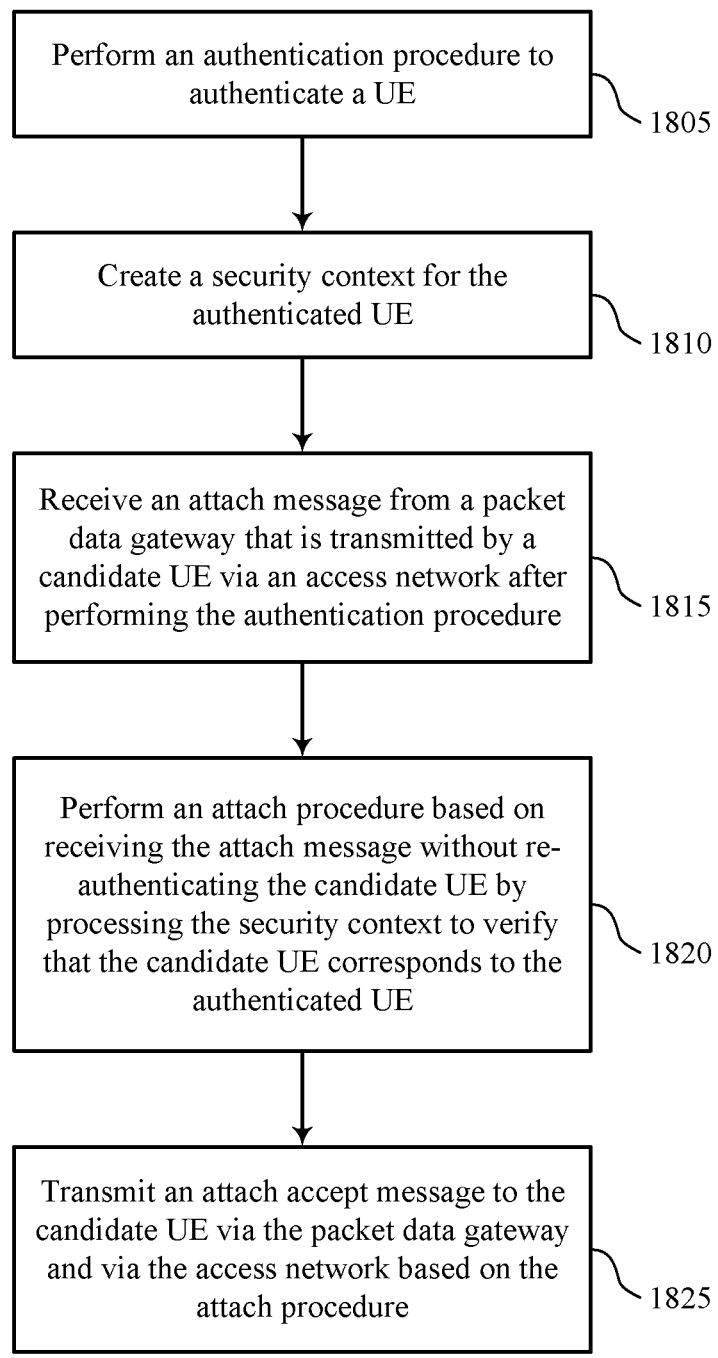

FIG. 18 shows a flowchart illustrating a method 1800 that supports connectivity to a core network via an access network in accordance with one or more aspects of the present disclosure. The operations of method 1800 may be implemented by a core network node or its components as described herein. In an example, the core network node may be the Serving CNCPF node 235. The operations of method 1800 may be performed by a core network node communications manager as described with reference to FIGS. 12 through 15. In some examples, a core network node may execute a set of codes to control the functional elements of the device to perform the functions described below. Additionally or alternatively, the core network node may perform aspects the functions described below using special-purpose hardware.

At 1805 the core network node may perform an authentication procedure to authenticate a UE. The operations at 1805 may be performed according to the methods described with reference to FIGS. 1 through 7. In certain examples, aspects of the operations at 1805 may be performed by a authentication manager component as described with reference to FIGS. 12 through 15.

At 1810 the core network node may create a security context for the authenticated UE. The operations at 1810 may be performed according to the methods described with reference to FIGS. 1 through 7. In certain examples, aspects of the operations at 1810 may be performed by a authentication manager component as described with reference to FIGS. 12 through 15.

At 1815 the core network node may receive an attach message from a PDG that is transmitted by a candidate UE via an access network after performing the authentication procedure. The operations at 1815 may be performed according to the methods described with reference to FIGS. 1 through 7. In certain examples, aspects of the operations at 1815 may be performed by an attach manager component as described with reference to FIGS. 12 through 15.

At 1820 the core network node may perform an attach procedure based at least in part on receiving the attach message without re-authenticating the candidate UE by processing the security context to verify that the candidate UE corresponds to the authenticated UE. The operations at 1820 may be performed according to the methods described with reference to FIGS. 1 through 7. In certain examples, aspects of the operations at 1820 may be performed by an attach manager component as described with reference to FIGS. 12 through 15.

At 1825 the core network node may transmit an attach accept message to the candidate UE via the PDG and via the access network based at least in part on the attach procedure. The operations at 1825 may be performed according to the methods described with reference to FIGS. 1 through 7. In certain examples, aspects of the operations at 1825 may be performed by an attach manager component as described with reference to FIGS. 12 through 15.

Figure 19:
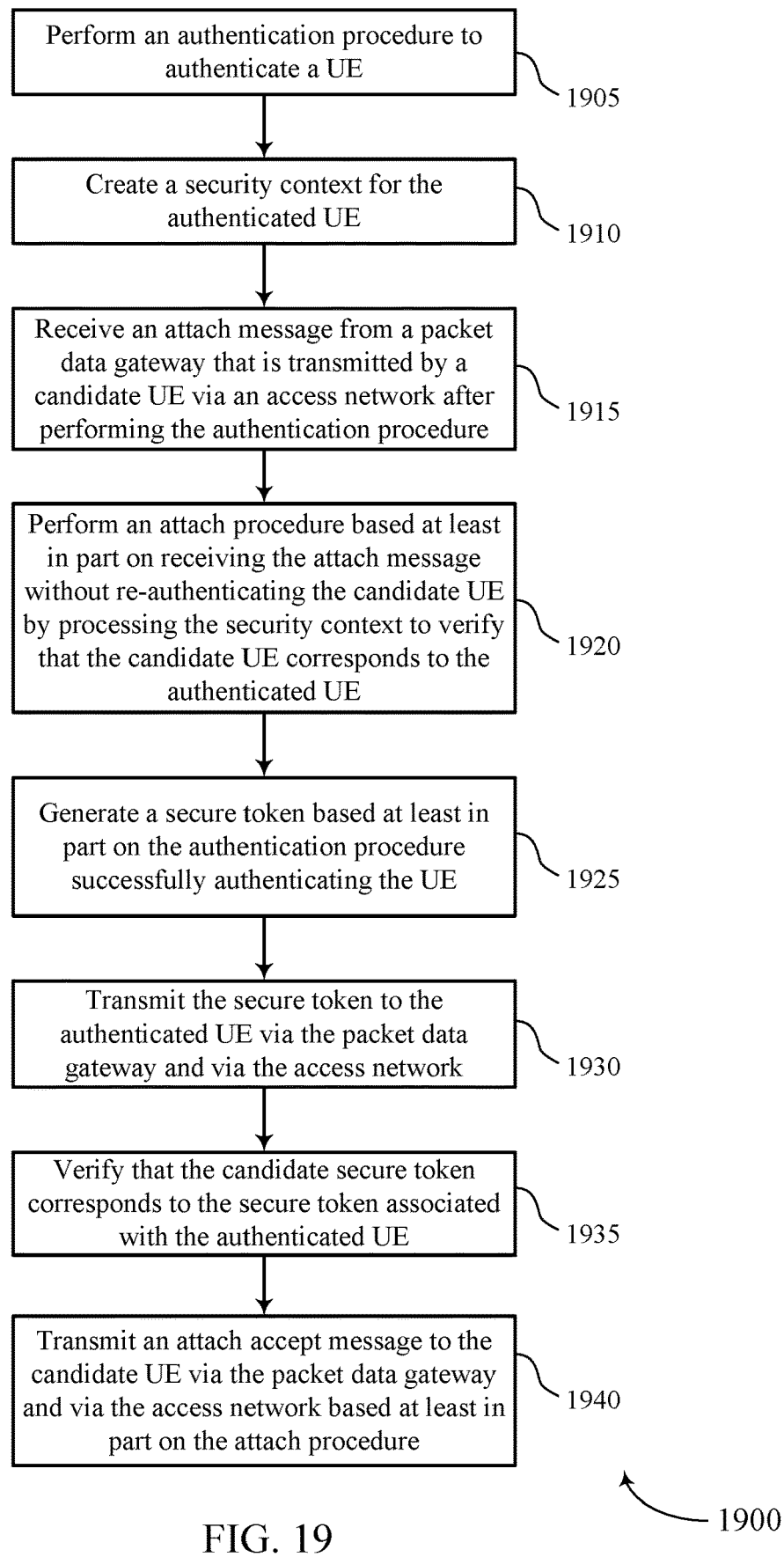

FIG. 19 shows a flowchart illustrating a method 1900 that supports connectivity to a core network via an access network in accordance with one or more aspects of the present disclosure. The operations of method 1900 may be implemented by a core network node or its components as described herein. In an example, the core network node may be the Serving CNCPF node 235. The operations of method 1900 may be performed by a core network node communications manager as described with reference to FIGS. 12 through 15. In some examples, a core network node may execute a set of codes to control the functional elements of the device to perform the functions described below. Additionally or alternatively, the core network node may perform aspects the functions described below using special-purpose hardware.

At 1905 the core network node may perform an authentication procedure to authenticate a UE. The operations at 1905 may be performed according to the methods described with reference to FIGS. 1 through 7. In certain examples, aspects of the operations at 1905 may be performed by a authentication manager component as described with reference to FIGS. 12 through 15.

At 1910 the core network node may create a security context for the authenticated UE. The operations at 1910 may be performed according to the methods described with reference to FIGS. 1 through 7. In certain examples, aspects of the operations at 1910 may be performed by a authentication manager component as described with reference to FIGS. 12 through 15.

At 1915 the core network node may receive an attach message from a PDG that is transmitted by a candidate UE via an access network after performing the authentication procedure. The operations at 1915 may be performed according to the methods described with reference to FIGS. 1 through 7. In certain examples, aspects of the operations at 1915 may be performed by an attach manager component as described with reference to FIGS. 12 through 15.

At 1920 the core network node may perform an attach procedure based at least in part on receiving the attach message without re-authenticating the candidate UE by processing the security context to verify that the candidate UE corresponds to the authenticated UE. The operations at 1920 may be performed according to the methods described with reference to FIGS. 1 through 7. In certain examples, aspects of the operations at 1920 may be performed by an attach manager component as described with reference to FIGS. 12 through 15.

At 1925 the core network node may generate a secure token based at least in part on the authentication procedure successfully authenticating the UE. The operations at 1930 may be performed according to the methods described with reference to FIGS. 1 through 7. In certain examples, aspects of the operations at 1930 may be performed by a authentication manager component as described with reference to FIGS. 12 through 15.

At 1930 the core network node may transmit the secure token to the authenticated UE via the PDG and via the access network. The operations at 1935 may be performed according to the methods described with reference to FIGS. 1 through 7. In certain examples, aspects of the operations at 1935 may be performed by a authentication manager component as described with reference to FIGS. 12 through 15.

At 1935 the core network node may verify that the candidate secure token corresponds to the secure token associated with the authenticated UE. The operations at 1940 may be performed according to the methods described with reference to FIGS. 1 through 7. In certain examples, aspects of the operations at 1940 may be performed by an attach manager component as described with reference to FIGS. 12 through 15.

At 1940 the core network node may transmit an attach accept message to the candidate UE via the PDG and via the access network based at least in part on the attach procedure. The operations at 1925 may be performed according to the methods described with reference to FIGS. 1 through 7. In certain examples, aspects of the operations at 1925 may be performed by an attach manager component as described with reference to FIGS. 12 through 15.

Figure 20:
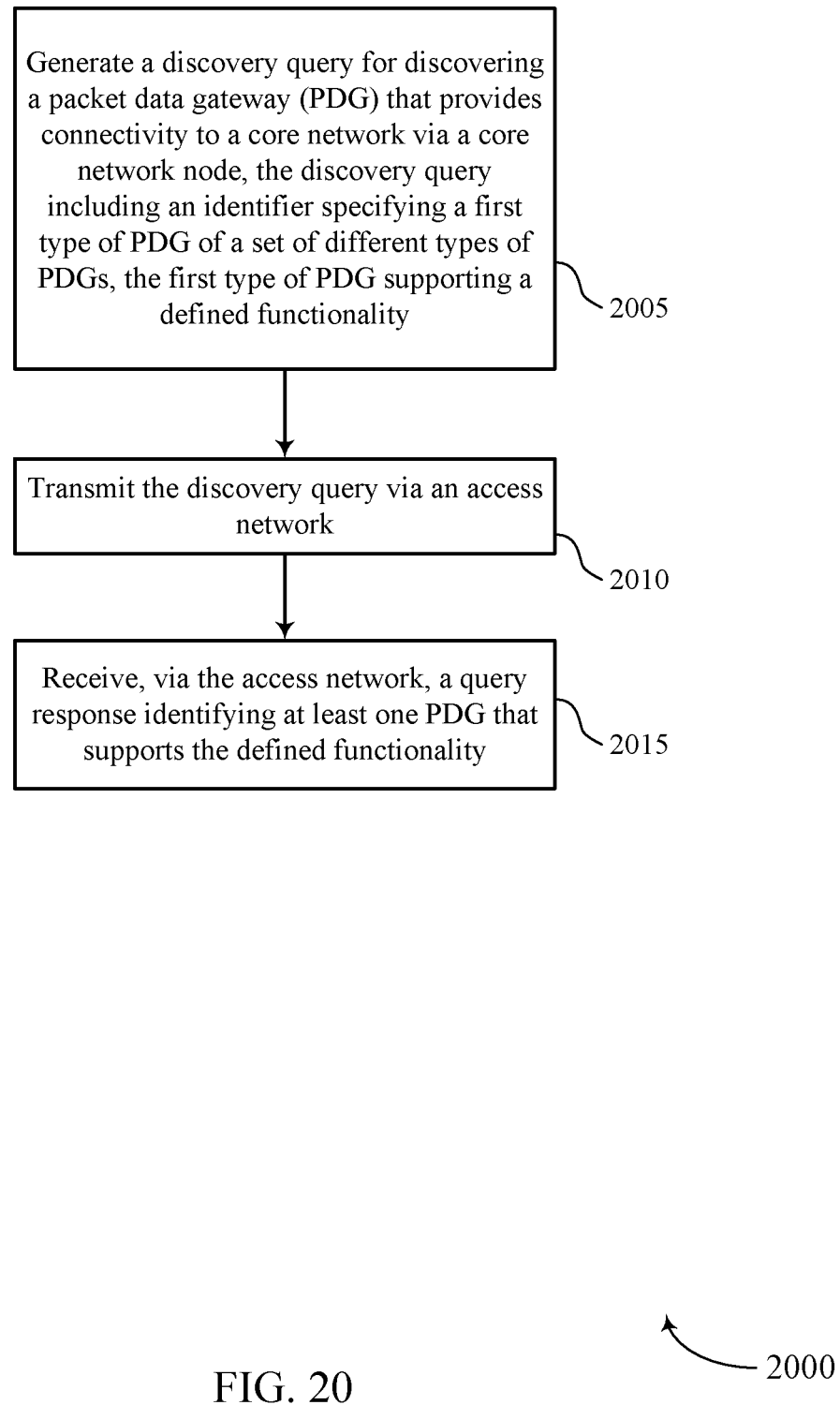

FIG. 20 shows a flowchart illustrating a method 2000 that supports connectivity to a core network via an access network in accordance with one or more aspects of the present disclosure. The operations of method 2000 may be implemented by a UE 115 or its components as described herein. For example, the operations of method 2000 may be performed by a UE communications manager as described with reference to FIGS. 7 through 9. In some examples, a UE 115 may execute a set of codes to control the functional elements of the device to perform the functions described below. Additionally or alternatively, the UE 115 may perform aspects of the functions described below using special-purpose hardware.

At 2005 the UE 115 may generate a discovery query for discovering a PDG that provides connectivity to a core network via a core network node, the discovery query including an identifier specifying a first type of PDG of a plurality of different types of PDGs, the first type of PDG supporting a defined functionality. The operations at 2005 may be performed according to the methods described herein. In certain examples, aspects of the operations at 2005 may be performed by a discovery component as described with reference to FIGS. 9 through 10.

At 2010 the UE 115 may transmit the discovery query via an access network. The operations at 2010 may be performed according to the methods described herein. In certain examples, aspects of the operations at 2010 may be performed by a connectivity component as described with reference to FIGS. 9 through 10.

At 2015 the UE 115 may receive, via the access network, a query response identifying at least one PDG that supports the defined functionality. The operations at 2015 may be performed according to the methods described herein. In certain examples, aspects of the operations at 2015 may be performed by a discovery component as described with reference to FIGS. 9 through 10.

Figure 21:
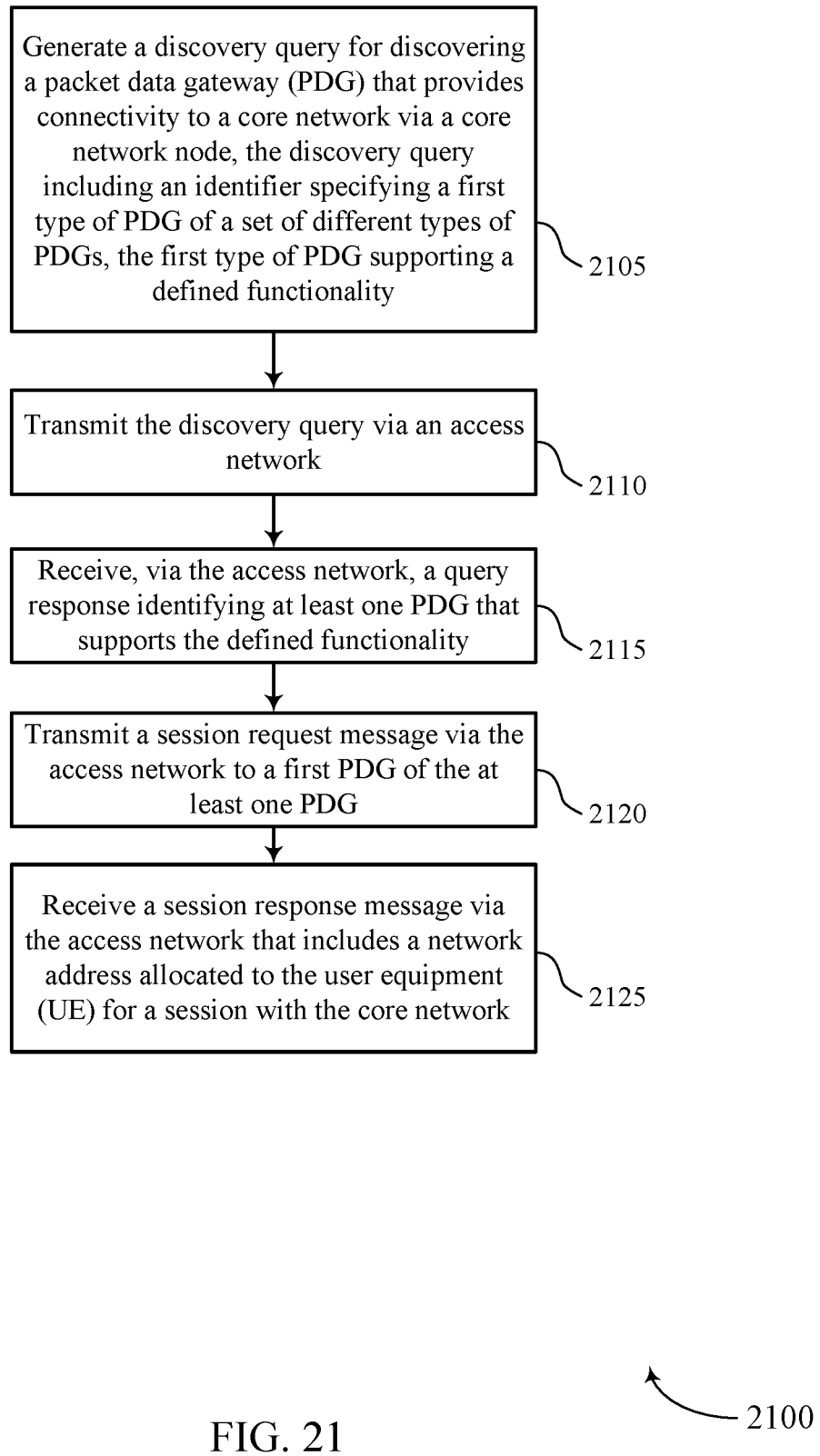

FIG. 21 shows a flowchart illustrating a method 2100 that supports connectivity to a core network via an access network in accordance with one or more aspects of the present disclosure. The operations of method 2100 may be implemented by a UE 115 or its components as described herein. For example, the operations of method 2100 may be performed by a UE communications manager as described with reference to FIGS. 7 through 9. In some examples, a UE 115 may execute a set of codes to control the functional elements of the device to perform the functions described below. Additionally or alternatively, the UE 115 may perform aspects of the functions described below using special-purpose hardware.

At 2105 the UE 115 may generate a discovery query for discovering a PDG that provides connectivity to a core network via a core network node, the discovery query including an identifier specifying a first type of PDG of a plurality of different types of PDGs, the first type of PDG supporting a defined functionality. The operations at 2105 may be performed according to the methods described herein. In certain examples, aspects of the operations at 2105 may be performed by a discovery component as described with reference to FIGS. 9 through 10.

At 2110 the UE 115 may transmit the discovery query via an access network. The operations at 2110 may be performed according to the methods described herein. In certain examples, aspects of the operations at 2110 may be performed by a connectivity component as described with reference to FIGS. 9 through 10.

At 2115 the UE 115 may receive, via the access network, a query response identifying at least one PDG that supports the defined functionality. The operations at 2115 may be performed according to the methods described herein. In certain examples, aspects of the operations at 2115 may be performed by a discovery component as described with reference to FIGS. 9 through 10.

At 2120 the UE 115 may transmit a session request message via the access network to a first PDG of the at least one PDG. The operations at 2120 may be performed according to the methods described herein. In certain examples, aspects of the operations at 2120 may be performed by a session component as described with reference to FIG. 10.

At 2125 the UE 115 may receive a session response message via the access network that includes a network address allocated to the UE for a session with the core network. The operations at 2125 may be performed according to the methods described herein. In certain examples, aspects of the operations at 2125 may be performed by a session component as described with reference to FIG. 10.

It should be noted that the methods described above describe possible implementations, and that the operations may be rearranged or otherwise modified and that other implementations are possible. Furthermore, aspects from two or more of the methods may be combined.

Techniques described herein may be used for various wireless communications systems such as CDMA, TDMA, FDMA, OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP LTE and LTE-Advanced (LTE-A) are releases of UMTS that use E-UTRA. UTRA, E-UTRA, UMTS, LTE, LTE-A, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE system may be described for purposes of example, and LTE terminology may be used in much of the description, the techniques described herein are applicable beyond LTE applications.

In LTE/LTE-A networks, including such networks described herein, the term evolved node B (eNB) may be generally used to describe the base stations. The wireless communications system or systems described herein may include a heterogeneous LTE/LTE-A network in which different types of evolved node B (eNBs) provide coverage for various geographical regions. For example, each eNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a CSG, UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative diagrams and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates an inclusive list such that, for example, a phrase referring to "at least one of" a list of items refers to any combination of those items, including single members. As an example, "at least one of: A, B, or C" is intended to cover A, B, C, A-B, A-C, B-C, and A-B-C., as well as any combination with multiples of the same element (e.g., A-A A-A-A, A-A-B, A-A-C, A-B-B, A-C-C, B-B, B-B-B, B-B-C, C-C, and C-C-C or any other ordering of A, B, and C).

As used herein, the phrase "based on" shall not be construed as a reference to a closed set of conditions. For example, an exemplary feature that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications by a user equipment (UE), comprising:
   generating a discovery query for discovering a packet data gateway (PDG) that provides connectivity to a core network via a core network node, the discovery query including a fully qualified domain name (FODN) that comprises a label selecting a first type of PDG from a plurality of different types of PDGs, including an evolved packet data gateway (ePDG) type and a next generation packet data gateway type, the selected first type of PDG supporting a defined functionality, the selected first type of PDG comprising the next generation packet data gateway type;
   transmitting the discovery query via an access network; and
   receiving, via the access network, a query response identifying at least one PDG that supports the defined functionality.

2. The method of claim 1, wherein the query response identifies at least one PDG that does not support the defined functionality.

3. The method of claim 1, further comprising:
   transmitting a session request message via the access network to a first PDG of the at least one PDG; and
   receiving a session response message via the access network that includes a network address allocated to the UE for a session with the core network.

4. The method of claim 1, further comprising:
   transmitting an attach message to a first PDG of the at least one PDG via the access network for establishing connectivity with the core network node via the first PDG; and
   receiving an attach accept from the core network node via the first PDG and the access network.

5. The method of claim 4, wherein the attach message indicates either a secure attachment or implicit attachment.

6. The method of claim 5, wherein the attach message indicates implicit attachment and that the UE does not support Non-Access Stratum (NAS) signaling.

7. The method of claim 1, wherein the discovery query comprises a domain name service (DNS) query, the identifier comprises a domain name identifier, and the query response comprises a DNS response.

8. The method of claim 1, further comprising:
   determining a list of addresses of one or more PDGs of the at least one PDG that each support the defined functionality based at least in part on the query response.

9. The method of claim 1, further comprising:
   performing an authentication procedure with the core network node via a first PDG of the at least one PDG for authenticating the UE with the core network;
   receiving control plane addressing information via the first PDG based at least in part on the authentication procedure; and
   performing, by transmitting an attach message to the first PDG using the control plane addressing information, an attach procedure with the core network node without re-authentication of the UE.

10. The method of claim 9, further comprising:
    transmitting control plane signaling to the core network node via the access network using the control plane addressing information.

11. The method of claim 9, wherein performing the attach procedure further comprises:
    establishing an internet protocol security (IPSec) tunnel with the first PDG via the access network.

12. The method of claim 9, further comprising:
    receiving a token from the core network node based at least in part on the authentication procedure; and
    transmitting the token in the attach message as an identifier of the UE.

13. The method of claim 9, wherein the attach procedure is performed without re-authentication of the UE based at least in part on a security context established for the UE during the authentication procedure.

14. The method of claim 13, further comprising:
    transmitting a session request message to the first PDG using the control plane addressing information, the session request message including a request to establish a session with the core network.

15. The method of claim 14, wherein transmitting the session request message comprises:
    transmitting the session request message over User Datagram Protocol/Internet protocol (UDP/IP) in an internet protocol security (IPSec) tunnel based at least in part on the control plane addressing information.

16. The method of claim 14, further comprising:
    receiving a session response message comprising a network address of a user plane for the session.

17. The method of claim 1, wherein the next generation packet data gateway type selected by the label of the FQDN of the discovery query comprises a Non-3GPP InterWorking Function (N3IWF) type.

18. An apparatus for wireless communications, comprising:
- a processor;
- memory coupled with the processor; and
- the processor and memory configured to:
  - generate a discovery query for discovering a packet data gateway (PDG) that provides connectivity to a core network via a core network node, the discovery query including a fully qualified domain name (FODN) that comprises a label selecting a first type of PDG from a plurality of different types of PDGs, including an evolved packet data gateway (ePDG) type and a next generation packet data gateway type, the selected first type of PDG supporting a defined functionality, the selected first type of PDG comprising the next generation packet data gateway type;
  - transmit the discovery query via an access network; and
  - receive, via the access network, a query response identifying at least one PDG that supports the defined functionality.

19. The apparatus of claim 18, wherein the query response identifies at least one PDG that does not support the defined functionality.

20. The apparatus of claim 18, wherein the instructions are further executable by the processor to:
- transmit a session request message via the access network to a first PDG of the at least one PDG; and
- receive a session response message via the access network that includes a network address allocated to the UE for a session with the core network.

21. The apparatus of claim 18, wherein the instructions are further executable by the processor to:
- transmit an attach message to a first PDG of the at least one PDG via the access network for establishing connectivity with the core network node via the first PDG; and
- receive an attach accept from the core network node via the first PDG and the access network.

22. The apparatus of claim 18, wherein the instructions are further executable by the processor to:
- determine a list of addresses of one or more PDGs of the at least one PDG that each support the defined functionality based at least in part on the query response.

23. The apparatus of claim 18, wherein the instructions are further executable by the processor to:
- perform an authentication procedure with the core network node via a first PDG of the at least one PDG for authenticating the UE with the core network;
- receive control plane addressing information via the first PDG based at least in part on the authentication procedure; and
- perform, by transmitting an attach message to the first PDG using the control plane addressing information, an attach procedure with the core network node without re-authentication of the UE.

24. The apparatus of claim 18, wherein the next generation packet data gateway type selected by the label of the FQDN of the discovery query comprises a Non-3GPP InterWorking Function (N3IWF) type.

25. An apparatus for wireless communications, comprising:
- means for generating a discovery query for discovering a packet data gateway (PDG) that provides connectivity to a core network via a core network node, the discovery query including a fully qualified domain name (FQDN) that comprises a label selecting a first type of PDG from a plurality of different types of PDGs, including an evolved packet data gateway (ePDG) type and a next generation packet data gateway type, the selected first type of PDG supporting a defined functionality, the selected first type of PDG comprising the next generation packet data gateway type;
- means for transmitting the discovery query via an access network; and
- means for receiving, via the access network, a query response identifying at least one PDG that supports the defined functionality.

26. The apparatus of claim 25, wherein the next generation packet data gateway type selected by the label of the FQDN of the discovery query comprises a Non-3GPP InterWorking Function (N3IWF) type.

27. A non-transitory computer-readable medium storing code for wireless communication, the code comprising instructions executable by a processor to:
- generate a discovery query for discovering a packet data gateway (PDG) that provides connectivity to a core network via a core network node, the discovery query including a fully qualified domain name (FQDN) that comprises a label selecting a first type of PDG from a plurality of different types of PDGs, including an evolved packet data gateway (ePDG) type and a next generation packet data gateway type, the selected first type of PDG supporting a defined functionality, the selected first type of PDG comprising the next generation packet data gateway type;
- transmit the discovery query via an access network; and
- receive, via the access network, a query response identifying at least one PDG that supports the defined functionality.

28. The non-transitory computer-readable medium of claim 27, wherein the next generation packet data gateway type selected by the label of the FQDN of the discovery query comprises a Non-3GPP InterWorking Function (N3IWF) type.

* * * * *